United States Patent [19]
Leedom et al.

[11] Patent Number: 6,012,135
[45] Date of Patent: Jan. 4, 2000

[54] COMPUTER HAVING MULTIPLE ADDRESS PORTS, EACH HAVING LOGICAL ADDRESS TRANSLATION WITH BASE AND LIMIT MEMORY MANAGEMENT

[75] Inventors: George W Leedom, Jim Falls; William T. Moore, Elk Mound, both of Wis.

[73] Assignee: Cray Research, Inc., Eagan, Minn.

[21] Appl. No.: 08/347,964

[22] Filed: Dec. 1, 1994

[51] Int. Cl.[7] .................................................. G06F 12/00
[52] U.S. Cl. ................... 711/208; 711/209; 711/206; 711/207; 711/140; 712/2
[58] Field of Search .................... 395/419, 416, 395/417, 415, 412, 413; 711/209, 206, 207, 205, 202, 203, 208, 140; 712/2

[56] References Cited

U.S. PATENT DOCUMENTS

| | | | |
|---|---|---|---|
| 4,128,880 | 12/1978 | Cray, Jr. ............................. | 395/800.04 |
| 4,473,878 | 9/1984 | Zolnowsky et al. .................... | 711/208 |
| 4,493,020 | 1/1985 | Kim et al. ............................ | 395/393 |
| 4,661,900 | 4/1987 | Chen et al. .......................... | 395/800.04 |
| 4,769,770 | 9/1988 | Miyadera et al. ...................... | 711/206 |
| 4,888,689 | 12/1989 | Taylor et al. .......................... | 711/140 |
| 4,899,275 | 2/1990 | Sachs et al. ............................ | 711/3 |
| 4,901,230 | 2/1990 | Chen et al. ............................. | 711/149 |
| 5,001,626 | 3/1991 | Kashiyama et al. .................. | 395/800.04 |
| 5,058,051 | 10/1991 | Brooks .................................. | 711/167 |
| 5,142,638 | 8/1992 | Schiffleger ............................ | 711/151 |
| 5,144,551 | 9/1992 | Cepulis ................................. | 711/163 |
| 5,247,637 | 9/1993 | Leedom et al. ......................... | 711/149 |
| 5,276,902 | 1/1994 | Nakatani et al. .................... | 395/800.06 |
| 5,341,485 | 8/1994 | Hattersley et al. ..................... | 711/207 |
| 5,349,667 | 9/1994 | Kaneko .................................. | 710/267 |
| 5,390,300 | 2/1995 | Pribnow et al. ........................ | 395/673 |
| 5,430,856 | 7/1995 | Kinoshita .............................. | 711/209 |
| 5,440,710 | 8/1995 | Richter et al. .......................... | 711/207 |
| 5,463,750 | 10/1995 | Sachs ..................................... | 711/169 |
| 5,515,525 | 5/1996 | Grynberg et al. ...................... | 395/500 |
| 5,517,651 | 5/1996 | Huck et al. ............................. | 395/570 |
| 5,566,311 | 10/1996 | Gochi ..................................... | 395/405 |
| 5,590,297 | 12/1996 | Huck et al. ............................. | 711/1 |
| 5,628,023 | 5/1997 | Bryant et al. ........................... | 395/800 |

OTHER PUBLICATIONS

Pp. 338–343 of "Structured Computer Organization", Third Edition, by Andrew S. Tanenbaum, 1990.

*Primary Examiner*—Eddie P. Chan
*Assistant Examiner*—Hong Kim
*Attorney, Agent, or Firm*—Schwegman, Lundberg Woesssner & Kluth, PA

[57] ABSTRACT

Method and apparatus for a logical address translator which translates a logical address into a physical address in a computer. The computer includes a plurality of address ports. Each address port includes a logical address translator, which includes a plurality of segment-register sets. Each segment-register set holds values which specify address boundaries and translation mapping of a corresponding logical segment. A segment detector is coupled to the plurality of segment-register sets, wherein the segment detector operates to determine whether the logical address is within the specified address boundaries of the logical segment. An address mapper is coupled to the plurality of segment-register sets, wherein the address mapper operates to translate the logical address into a physical address. A translation controller is connected to the segment detector and the address translator, wherein the translation controller operates to output the physical address if the segment detector determines that the logical address is within the specified address boundaries of the logical segment. One embodiment of the segment-register set includes a base address, a limit address, and a physical mapping bias. One embodiment of the computer includes a plurality of address ports, wherein each address port includes a logical address translator.

35 Claims, 18 Drawing Sheets

| DESTINATION | BIT | | | | | | | | | | | | | |
|---|---|---|---|---|---|---|---|---|---|---|---|---|---|---|
| | 13 | 12 | 11 | 10 | 9 | 8 | 7 | 6 | 5 | 4 | 3 | 2 | 1 | 0 |
| CACHE READ | 1 | 1 | 1 | – | | | | | WORD# | | | | | |
| V REGISTER READ | 1 | 1 | 0 | REGISTER# | | | – | ELEMENT# | | | | | | |
| S REGISTER READ | 1 | 0 | 1 | REGISTER# | | | 0 | | | | | | | |
| A REGISTER READ | 1 | 0 | 1 | REGISTER# | | | 1 | | | | | | | |
| T REGISTER READ | 1 | 0 | 0 | – | | | 0 | – | | REGISTER# | | | | |
| B REGISTER READ | 1 | 0 | 0 | – | | | 1 | – | | REGISTER# | | | | |
| FETCH READ | 0 | 1 | 1 | GROUP# | | | – | | | WORD# | | | | |
| I/O READ | 0 | 1 | 0 | TYPE | | | 1 | – | | | | | | |
| EXCHANGE READ | 0 | 0 | 1 | | | – | | TYPE | | WORD# | | | | |
| I/O WRITE | 0 | 0 | 0 | – | 0 | 1 | 0 | | | – | | | | |
| PROCESSOR WRITE | 0 | 0 | 0 | – | 1 | 1 | 0 | | | – | | | | |
| RECONFIGURE | 0 | 0 | 0 | – | 0 | 0 | 0 | A/S | | – | | | | |
| MEMORY ERROR | 0 | 0 | 0 | – | 0 | 0 | 0 | | | – | | | | |

FIG. 9

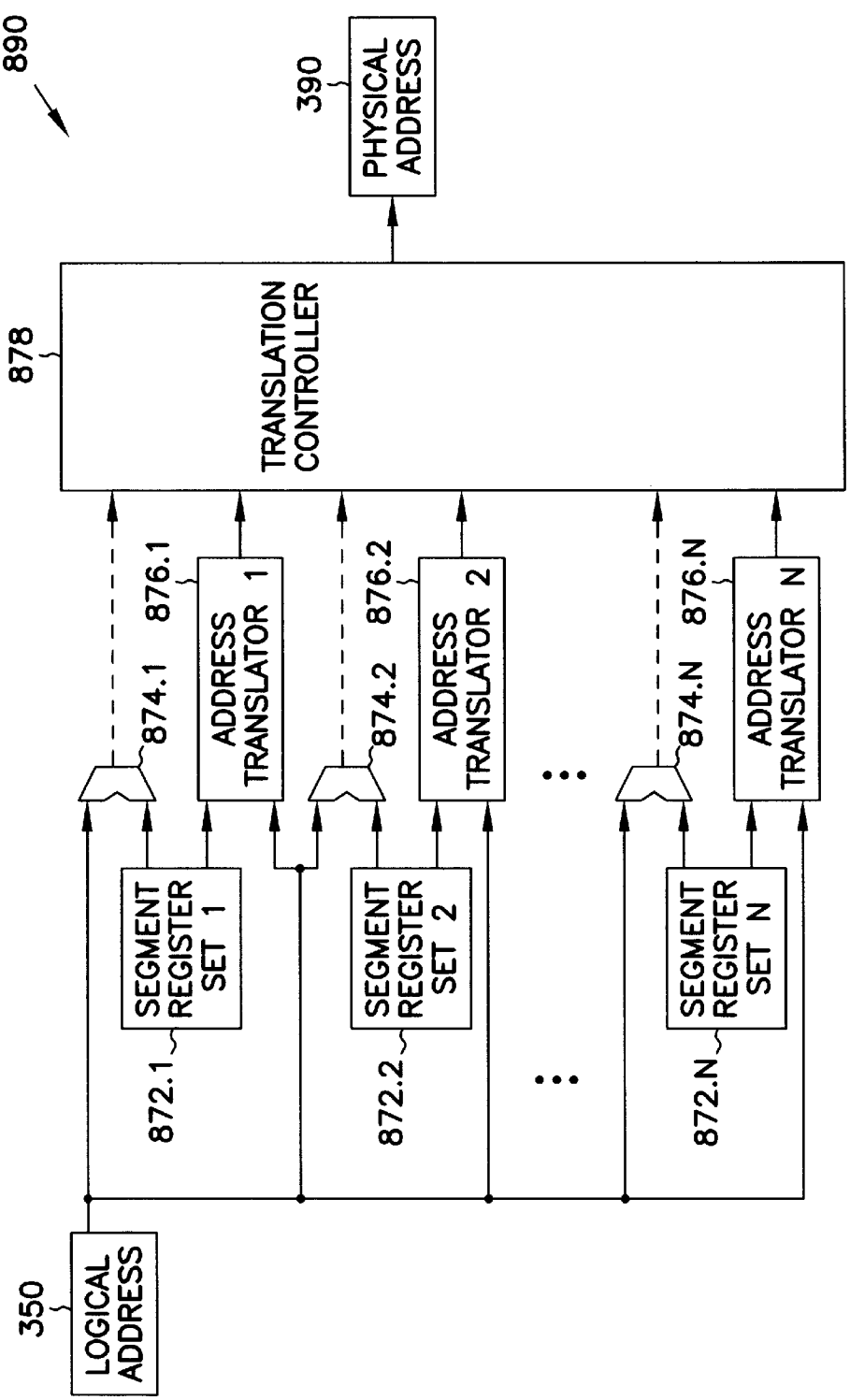

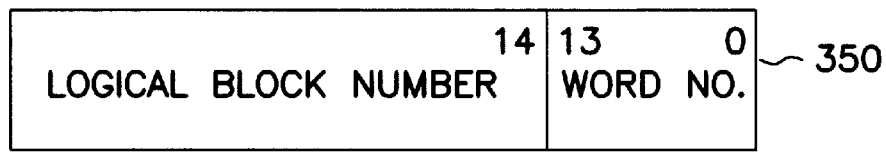
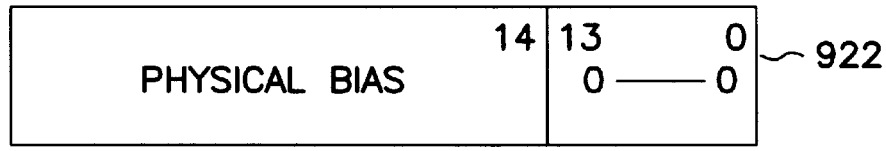
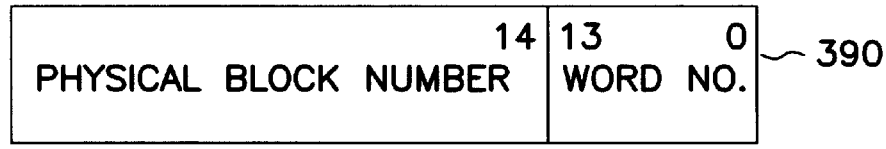
FIG. 12B
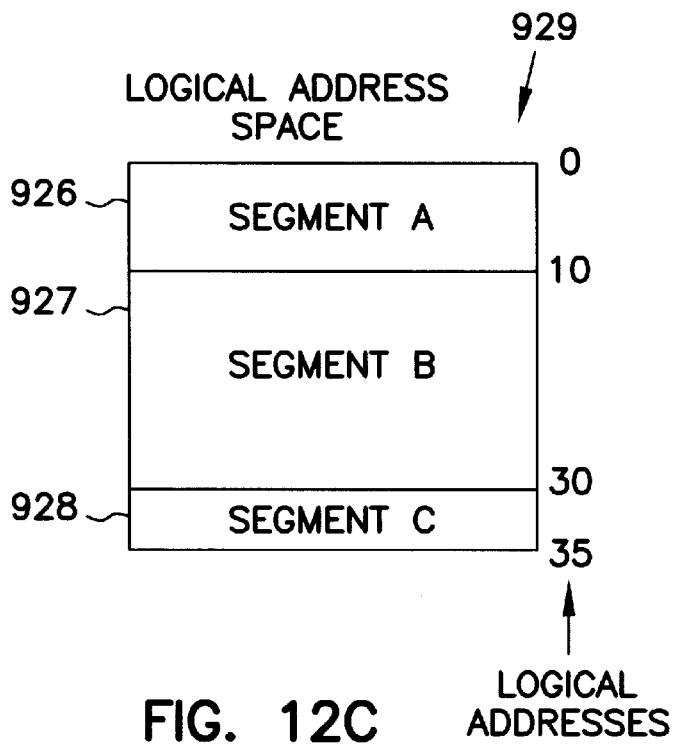
FIG. 12C

| WORD NUMBER | | 63 0 | 48 47 15 16 | BIT NUMBER | 32 31 31 32 | | 16 15 47 48 | | 0 63 |
|---|---|---|---|---|---|---|---|---|---|
| 0 | LAT 0 MODES R W X C | 39 | LAT 0 LOGICAL LIMIT | | 14 | 39 | LAT 0 LOGICAL BASE | | 14 |
| 1 | LAT 1 MODES R W X C | 39 | LAT 1 LOGICAL LIMIT | | 14 | 39 | LAT 1 LOGICAL BASE | | 14 |
| 2 | LAT 2 MODES R W X C | 39 | LAT 2 LOGICAL LIMIT | | 14 | 39 | LAT 2 LOGICAL BASE | | 14 |
| 3 | LAT 3 MODES R W X C | 39 | LAT 3 LOGICAL LIMIT | | 14 | 39 | LAT 3 LOGICAL BASE | | 14 |
| 4 | LAT 4 MODES R W X C | 39 | LAT 4 LOGICAL LIMIT | | 14 | 39 | LAT 4 LOGICAL BASE | | 14 |
| 5 | LAT 5 MODES R W X C | 39 | LAT 5 LOGICAL LIMIT | | 14 | 39 | LAT 5 LOGICAL BASE | | 14 |
| 6 | LAT 6 MODES R W X C | 39 | LAT 6 LOGICAL LIMIT | | 14 | 39 | LAT 6 LOGICAL BASE | | 14 |
| 7 | LAT 7 MODES R W X C | 39 | LAT 7 LOGICAL LIMIT | | 14 | 39 | LAT 7 LOGICAL BASE | | 14 |

| FIG. 13A |
|---|
| FIG. 13B |

FIG. 13

COMPUTER HAVING MULTIPLE ADDRESS PORTS, EACH HAVING LOGICAL ADDRESS TRANSLATION WITH BASE AND LIMIT MEMORY MANAGEMENT

FIELD OF THE INVENTION

The present invention relates to logical-address translation for highspeed computers and more specifically to logical-address translation in computers with base and limit memory management.

BACKGROUND OF THE INVENTION

A high-speed computer needs fast access to data in memory. The largest and fastest of such computers are known as supercomputers. One method of speeding up a computer is by "pipelining," wherein the computer's digital logic between an input and an output is divided into several serially connected successive stages. Data are fed into the computer's input stage before data previously input are completely processed through the computer's output stage. There are typically many intermediate stages between the input stage and the output stage. Each stage performs a portion of the overall function desired, adding to the functions performed by previous stages. Thus, multiple pieces of data are in various successive stages of processing at each successive stage of the pipeline between the input and output stages. Preferably, each successive system clock propagates the data one stage further in the pipeline.

As a result of pipelining, the system clock can operate at a faster rate than the speed of system clocks of non-pipelined machines. In some of today's computers, the system clock cycles in as fast as two nanoseconds ("ns"), allowing up to 500 million operations per second though a single functional unit. Parallel functional units within each processor, and parallel processors within a single system, allow even greater throughput. Achieving high-performance throughputs is only possible, however, if data are fed into each pipeline at close to the system clock rate.

As processor speeds have increased, the size of memory in a typical computer has also increased drastically. In addition, error-correction circuitry is now placed in the memory path to increase reliability. Memory-access speeds have improved over time, but the increased size of memory and the complexity of error-correction circuitry have meant that memory-access time has remained approximately constant. For example, a typical supercomputer system clock rate may have improved from roughly 8 ns to 4 ns to 2 ns over three generations. Over the same time period, memory-access times may have remained at approximately 96 ns. These times mean that the 8-ns processor accesses memory in 12 clocks, the 4-ns processor in 24 clocks, and the 2-ns processor in 48 clocks. As a result, a computer which randomly accessed data throughout memory would see almost no overall dataprocessing-speed improvement even if the system clock rate is increased dramatically.

One solution has been to organize data into vectors, each comprising a plurality of data elements, and where, during processing, each element of a vector has similar operations performed on it. Computer designers schedule various portions of the memory to simultaneously fetch various elements of a vector, and these fetched elements are fed into one or more parallel pipelines on successive clock cycles. Within a processor, the vector is held in a vector register comprised of a plurality of vector register elements. Each successive vector-register element holds a successive element of the vector. A "vector-load" operation transfers a vector from memory into a vector register. For example, a vector in memory may be held as a vector image wherein successive elements of the vector are held in successive locations in memory. A vector-load operation moves elements which comprise a vector into pipelines which couple memory to the vector registers. Overlapped with these vector-load operations, there could be two other pipelines taking data from two other vector registers to feed a vector processor, with the resultant vector fed through a pipeline into a third vector register. Examples of such designs are described in U.S. Pat. No. 4,661,900 issued Apr. 28,1987 to Chen et al. and U.S. Pat. No. 5,349,667 issued Sep. 20, 1994 to Cray et al., which are hereby incorporated by reference. For example, in a well-tuned system using 2-ns pipeline clocks, the throughput can approach 500 million operations per second for a single vector processor, even with relatively slow memory-access times.

On the other hand, a scalar processor operating in such a system on somewhat randomly located data must deal with a 48-clock pipelined-access time, and must often wait for the results from one operation before determining which data to request next.

In very-high-speed vector processors, such as the Cray Y-MP C90 manufactured by Cray Research Inc., the assignee of the present invention, a computer system contains a number of central processing units ("CPUs"), each of which may have more than one vector processor and more than one scalar processor. The computer system also contains a number of common memories which store the programs and data used by the CPUs. Vector data are often streamed or pipelined into a CPU from the memories, and so a long access time may be compensated for by receiving many elements on successive cycles as the result of a single request. In contrast, scalar data read by one of the CPUs from one of the common memories may take an inordinate amount of time to access.

Many computers use virtual or logical addresses to simplify the generation of programs. In such a computer, there are typically a plurality of programs simultaneously loaded into memory, and the computer time-multiplexes among these programs. In some computers, programs are loaded and must remain in their entirety in memory before they can run. If programs must be placed into just one or two segments in physical memory, the memory-manager program must find or provide a contiguous space in physical-memory space for each such large segment. If no space large enough can be found, programs in physical-memory must be swapped out to mass storage (such as disk storage) in order to make room. In order to provide finer granularity and ease the task of memory management, a program is subdivided into smaller pieces.

One conventional method of doing this is to provide a large number of page-sized divisions of a logical-address space, and map these onto equal-sized page frames in a physical-address space—typically a time-consuming process.

In some computers, only relatively small portions of a program are brought into memory at any one time, and as the program runs, the computer detects attempted accesses to pages not in memory (such accesses are called "page faults"), and the computer interrupts the program in order to load the needed page, and later resumes execution of the program. Such page-fault interrupts are time-consuming and handling them reliably is quite complex.

SUMMARY OF THE INVENTION

A method and apparatus are described for a logical address translator mechanism which translates a logical address into a physical address in a computer. The computer includes a plurality of address ports. Each address port includes a logical address translator, which includes a plurality of segment-register sets. Each segment-register set holds values which specify address boundaries and translation mapping of a corresponding logical segment. A segment detector is coupled to the plurality of segment-register sets, wherein the segment detector operates to determine whether the logical address is within the specified address boundaries of the logical segment. An address mapper is coupled to the plurality of segment-register sets, wherein the address mapper operates to translate the logical address into a physical address. A translation controller is connected to the segment detector and the address translator, wherein the translation controller operates to output the physical address if the segment detector determines that the logical address is within the specified address boundaries of the logical segment. One embodiment of the segment-register set includes a base address, a limit address, and a physical mapping bias. One embodiment of the computer includes a plurality of address ports, wherein each address port includes a logical address translator.

BRIEF DESCRIPTION OF THE DRAWINGS

FIG. 9 is a schematic diagram illustrating an embodiment of a destination-encode encode table.

FIG. 11A is a schematic diagram illustrating an embodiment of a logical-address translator 890.

FIG. 12A, 12B and 12C together form a diagram illustrating an embodiment of the translation of a logical address 350 into a physical address 390.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
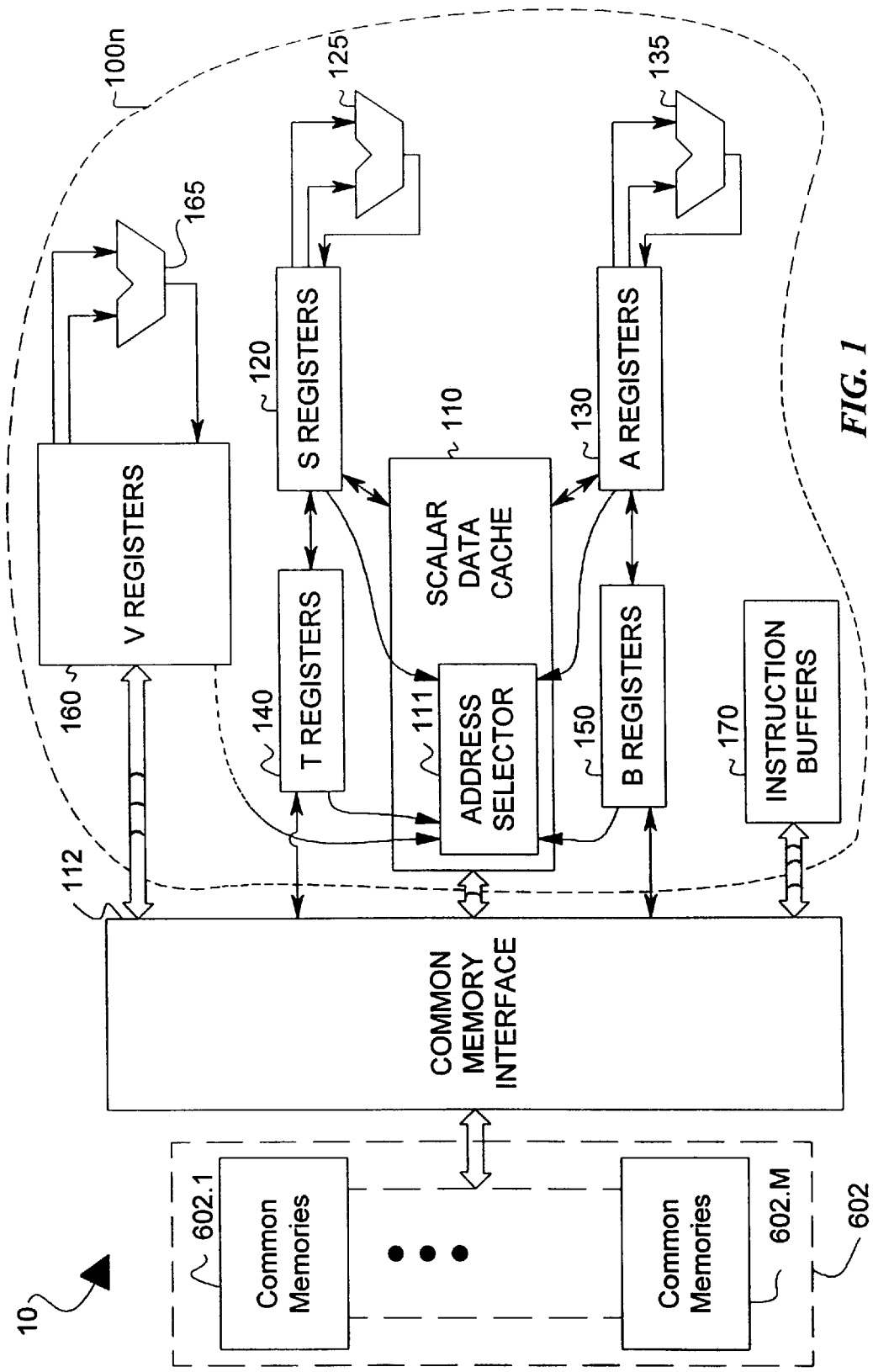
FIG. 1 is a schematic diagram of a scalar/vector supercomputer constructed according to the present invention.

FIG. 1 is a schematic diagram illustrating an embodiment of a scalar/vector supercomputer 10 constructed according to the present invention. Scalar/vector supercomputer 10 includes a scalar/vector processor CPU 100 connected through a common-memory interface 112 to one or more sections of common memories 602.1 through 602.M, collectively referred to as common memories 602. "Memory" for main memory 602 may include a secondary cache; main memories, such as those implemented with dynamic random access memories (DRAMs), static random access memories (SRAMs) and video random access memories (VRAMs); and mass-storage devices such as hard magnetic disks, optical disks, and magnetic tape units. In one embodiment, CPU 100 is one of a plurality of substantially similar CPUs 100, each connected to common memories 602. In one such embodiment, the interface between common-memory interface 112 and common memories 602 includes a plurality of address ports, plus eight data-out ports and eight data-in ports, each data port having 64 data bits. In another such embodiment, common memories 602 comprises a single section of common memory 602.1.

In FIG. 1, CPU 100 comprises S registers 120, A registers 130, T registers 140, B registers 150, V registers 160, instruction buffers 170, vector processor 165, scalar processor 125, address processor 135, and scalar data cache 110. Common-memory interface 112 provides access for scalar/vector processor CPU 100 to common memories 602. In one embodiment, common memories 602 are also connected through common-memory interface 112 to a plurality of other scalar/vector processor CPUs 100 (not shown) substantially similar to CPU 100, forming a multi-processor, multi-memory system.

Scalar data cache 110 provides a local cached copy of a subset of the data stored in common memories 602. That locally cached copy can be quickly accessed by at least one of the registers in CPU 100. In some embodiments, it may not be practical to make scalar data cache 110 accessible to all of the registers in CPU 100 (such access causes additional loading and wiring complexity). In the embodiment shown in FIG. 1, only scalar S registers 120 and address A registers 130 can fetch from and write-through (also called store-through) scalar data cache 110, while all other registers must access data directly from common memories 602 through common-memory interface 112.

The term "write through" (also called "store through") as used in this description is defined as the action of storing a data value from a register into scalar data cache 10 as a part of the operation storing that data value to the corresponding location in the common memories 602. In a write-through operation, CPU 100 appears to write the data through scalar data cache 110 to the common memories 602. For example, a write operation from one of the scalar S registers 120 updates scalar data cache 110 and the corresponding location in common memories 602. Any subsequent instruction fetching data from that memory location to a register which has no access path to data in scalar data cache 110 fetches the correct updated data from common memories 602, since data in the common memories 602 are updated every time the data in scalar data cache 110 are updated. Any subsequent instruction fetching data to a register which can access data in scalar data cache 110, instead of fetching data from common memories 602, rather fetches the correct updated data from scalar data cache 110. For example, in the embodiment shown in FIG. 1, a vector register in V registers 160 fetches the stored data from common memories 602, but an address register in A registers 130 fetches the data from scalar data cache 110.

In one such embodiment of scalar data cache 110, cache controller 210 includes a cache-line-pipeline overwrite mechanism. This mechanism stores scalar data, for example from A registers 120, into common memory 602 immediately, and if a cache-line fetch including that data was in-progress then waits for that cache-line fetch through a pipeline to complete and rewrites the scalar data on top of the corresponding fetched cache-line from the pipeline.

To maintain data integrity among the various parts of CPU 100, write operations from the other registers, including T registers 140, B registers 150, (in the present discussion, "B" and "T" registers are arbitrary designations for two groups of registers in CPU 100 which serve as temporary register storage for A registers 130 and S registers 120, respectively) and vector "V" registers 160, must signal scalar data cache 110 of any such store operations ("stores") they perform, in order that any "stale" data in scalar data cache 110 get marked as invalid (i.e., if a write is performed to a location in common memories 602 which is currently also mapped or contained in scalar data cache 110, the entry corresponding to that location in scalar data cache 110 must be marked as invalid). In the embodiment shown in FIG. 1, memory addresses are metaphorically shown as signalling to address selector 111 in scalar data cache 110 from registers 120, 130, 140, 150 and 160, although the logic for one such embodiment actually derives and signals these memory addresses from store-operation instructions decoded by an instruction decoder (not shown) coupled to instruction buffers 170.

The term "stale" as used in this description refers to data which do not reflect the latest and most current values for such data.

Figure 7:
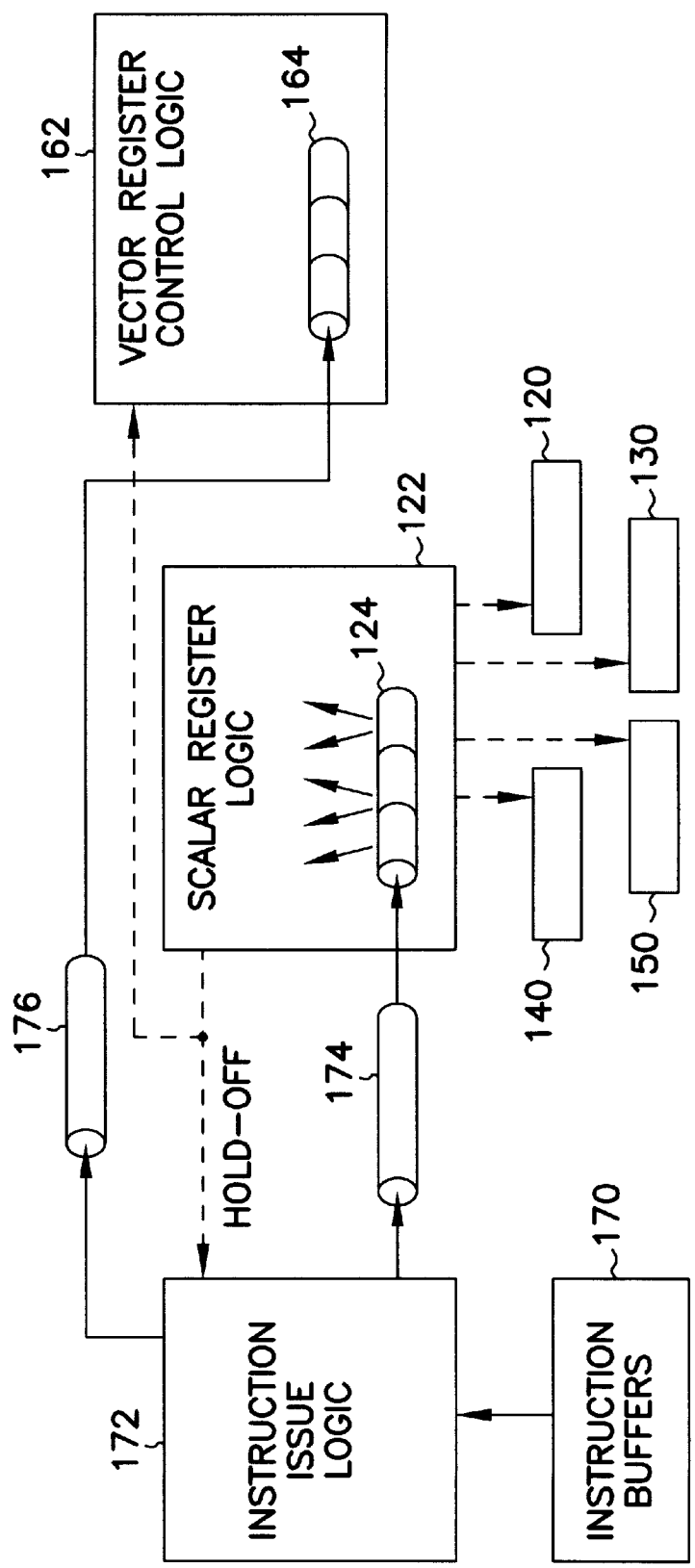
FIG. 7 is a schematic diagram illustrating an embodiment of hold-off logic.

Any pipelined computer must accommodate instructions which modify data which may be in its pipelines. Thus, any write operation must account for data which may be in a pipeline (e.g., data stored from the scalar registers must be reflected in the data which have been fetched and are in a pipeline for a subsequent operation by a vector register). Such pipeline maintenance is accomplished in one embodiment by constraining the processor 100 to be processing, at most, one outstanding write operation at a time. Referring to FIG. 7, if a second write request enters scalar-register-control logic 122 handling the scalar registers (i.e., A registers 130, S registers 120, B registers 150, and T registers 140), scalar-register-control logic 122 holds-off issue of any further instructions until the first write operation has completed. In one embodiment, scalar-register-control logic 122 further includes pipeline logic 124 sufficient to hold up to two pending write operations in addition to the one outstanding write operation, in order to hold operations sent by instruction issue logic 172 into pipeline 174 before it could act upon the hold-off signal sent by scalar-register-control logic 122. In one such embodiment, any scalar cache operation also holds-off any vector operation to and/or from memory, by scalar register logic 122 signalling a hold-off to instruction issue logic 172 and vector-register-control logic 162. Vector-register-control logic 162 further includes vector-pipeline logic 164 sufficient to hold any pending vector memory operations sent by instruction-issue logic 172 into pipeline 176 before it could act upon the hold-off signal sent by scalar-register-control logic 122.

In contrast to the above embodiment, another embodiment of scalar data cache 110 has a cache controller 210 which includes a pipeline-purge mechanism for cancelling a cache-line fetch from a pipeline and rescheduling the cache-line fetch for the pipeline after storing a word to the common memory. In such an embodiment, vector stores are not held-off, as in the above embodiment, but rather proceed simultaneously with scalar operations, but when it is detected that an address from the vector store operation is to a location which has a scalar cache line fetch in progress, cache controller 210 invalidates the affected cache line and reschedules the cache-line fetch for the pipeline after storing a word to the common memory.

In yet another embodiment of scalar data cache 110, cache controller 210 includes a cache-purge mechanism for invalidating all cache lines in the cache array in response to detecting a task-swap program exchange (when the currently operating task is swapped out and another task is swapped in).

In one embodiment of scalar/vector supercomputer 10, shown in FIG. 1, V registers 160 include eight vector registers, each containing up to 128 vector elements of 64 bits per element. Vector processors 165 process successive vector elements on successive clock cycles, but in a pipelined manner. For example, a single pipeline will add 128 consecutive elements of source vector register $V_j$ to 128 corresponding consecutive elements of source vector register $V_k$ on 128 successive clock cycles, with the results of these 128 operations being loaded into the 128 corresponding consecutive elements of destination vector register $V_i$. Multiple pipelines can be activated to operate in an overlapped manner to achieve greater performance. Each pipeline may take several cycles to initially load the pipeline, but when loaded, each pipeline operating in parallel can then deliver results at a rate of one element result per clock, thus providing several result elements per clock.

Since, in the embodiment shown in FIG. 1, the contents of V registers 160 cannot be stored into scalar data cache 110, any write operation from V registers 160 to common memories 602 marks any corresponding data held in scalar data cache 110 as invalid, in order that cache data do not become "stale". To prevent a data word (for a particular word address in memory) which is in transit in one pipeline from bypassing data (for that same word address) in another pipeline, one embodiment of the present invention will block execution of any vector fetch or store operation to memory during any scalar activity to memory.

In one embodiment of the scalar/vector supercomputer 10 shown in FIG. 1, S registers 120 include eight scalar registers, each containing 64 bits. T registers 140 include sixty-four scalar registers, each containing 64 bits. A registers 130 include eight address registers, each containing 64 bits. B registers 150 include sixty-four scalar registers, each containing 64 bits. Instruction buffers 170 include eight groups of thirty-two instruction-buffer registers per group, each instructionbuffer register containing 64 bits.

In one such embodiment, instructions are fetched into groups in instruction buffers 170 for execution. Since data are only fetched into instruction buffers 170, and never stored, scalar data cache 110 ignores data transfers to instruction buffers 170, and because of this, programmers using this system are cautioned to avoid writing self-modifying code. Such code may run unpredictably due to random timing interactions between instruction pre-fetch and cache operations.

In some embodiments, scalar processor 125 can process successive scalar registers on successive clock cycles, but in a less efficient pipelined manner than occurs with the method used by the vector processor described above, because of register-reservation complexities due to the non-ordered nature of the scalar registers, as compared to the vector registers. The contents of T registers 140 can be transferred to and from S registers 120, and to and from common memories 602. Again, since in one embodiment the contents of T registers 140 cannot be stored into scalar data cache 110, any write operation from T registers 140 to common memories 602 must mark any corresponding data held in scalar data cache 110 as invalid, in order that the cache data do not become "stale". Address processor 135 can process successive address registers on successive clock cycles, but also in a less efficient pipelined manner than occurs with the method used by the vector processor described above. The contents of B registers 150 can be transferred to and from A registers 130, and to and from common memories 602. Yet again, since in the preferred embodiment the contents of B registers 150 cannot be stored into scalar data cache 110, any write operation from B registers 150 to common memories 602 must mark any corresponding data held in scalar data cache 110 as invalid, in order that the cache data do not become "stale."

Figure 2:
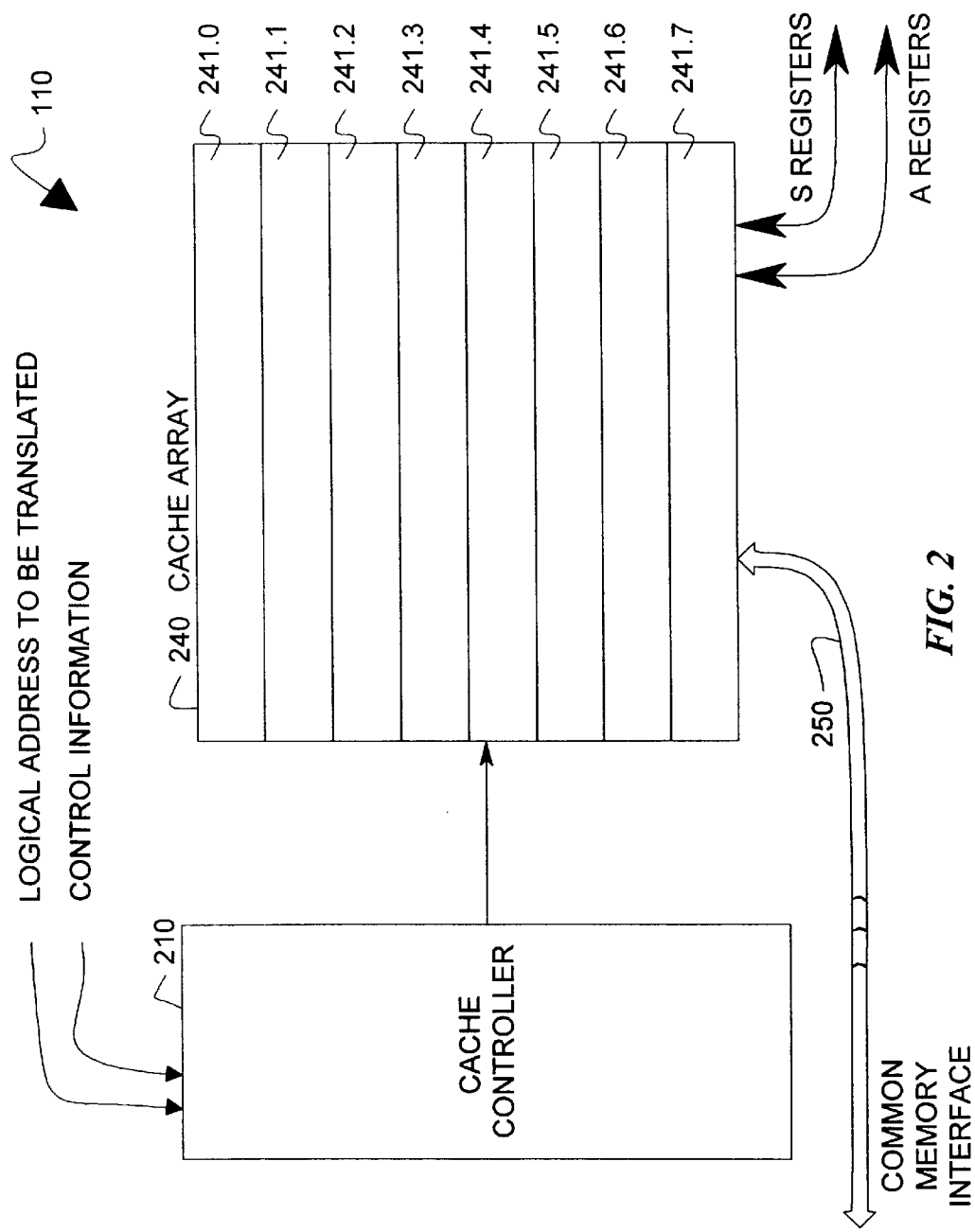
FIG. 2 is a schematic diagram illustrating details of an embodiment of scalar data cache 110 shown in FIG. 1.

FIG. 2 is a schematic diagram illustrating details of a scalar/vector supercomputer 10 such as that shown in FIG. 1, showing details of scalar data cache 110. Cache controller 210 examines the reference addresses of accesses going to common memories 602 in FIG. 1, as well as control information indicating the source- or destination-register designation and whether the access is a load or a store. In one embodiment, the reference address which is used is the logical address 350 from the program being executed. In another embodiment, a physical address 390 (see FIG. 12A) is used as the reference address. From this reference address and control information, cache controller 210 maintains a cache-data image in cache array 240. This cache-data image is a relatively small subset of the system-data image kept in common memories 602 of FIG. 1. To maintain the cache-data image, cache controller 210 maintains control information corresponding to each entry in cache array 240. For instance, in the embodiment shown in FIG. 3, logical-page addresses of the pages in scalar data cache 110 are stored in LAPIC registers 310. Similarly, validity information for each cache line stored is placed in validity bits 340.

In an alternative embodiment, rather than storing the logical-page or physical-page addresses directly in LAPIC registers 310, an encoded value corresponding to each logical-page address is stored in LAPIC registers 310. That is, the value stored for a logical-page address can be encoded in any number of ways. For example, the two's complement of the logical-page address bits might be used as the indication of which page was in cache, such that when added to the matching logical-page address being translated, a zero result indicates a page hit (utilizing the fact that any number added to its two's complement results in a zero sum). Similarly, the value stored for a physical-page address can be encoded in any number of ways, for embodiments using physical addressing to access data in scalar data cache 110.

Figure 3:
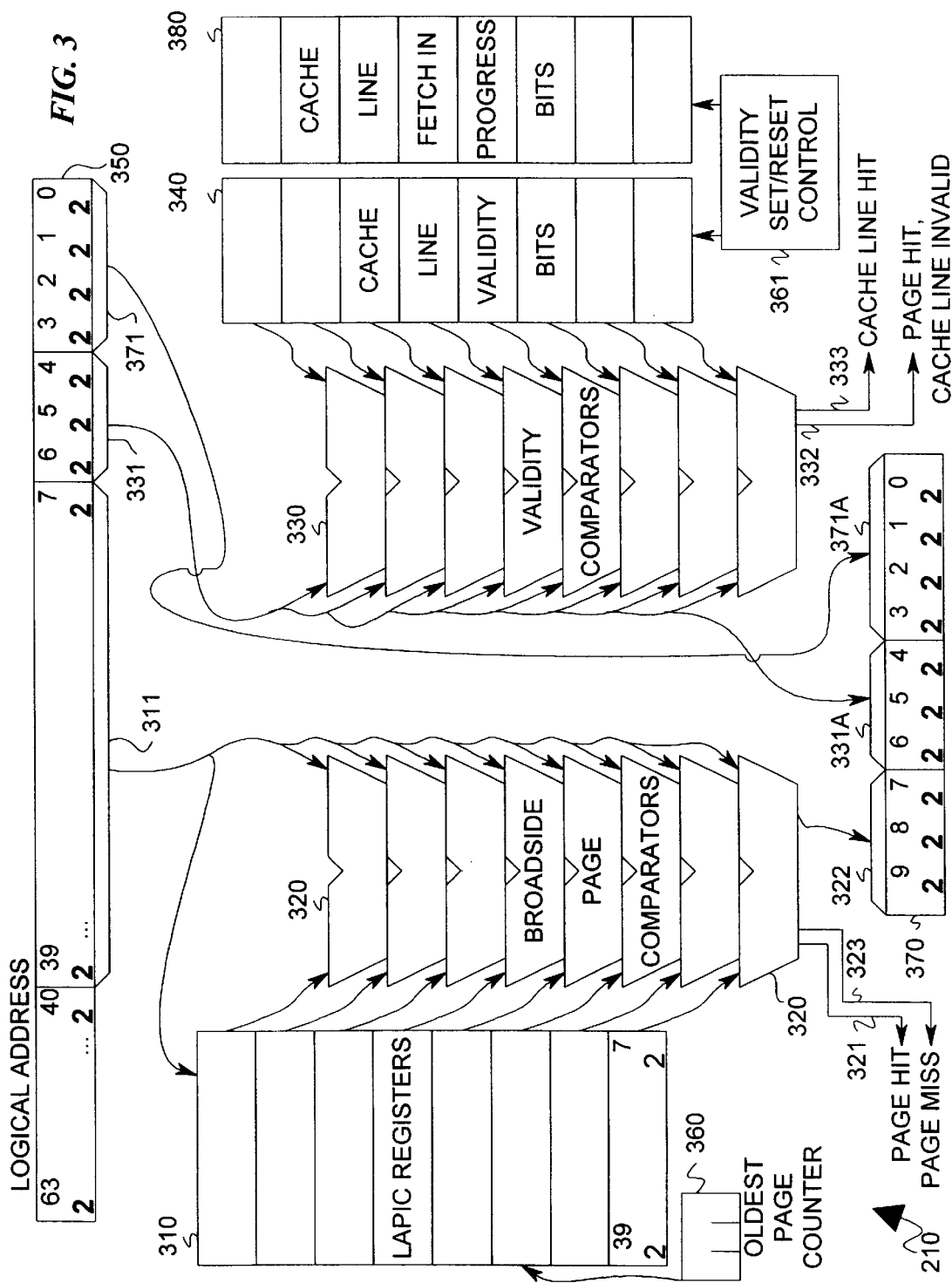
FIG. 3 is a schematic diagram illustrating details of an embodiment of cache controller 210 shown in FIG. 2.
Figure 6:
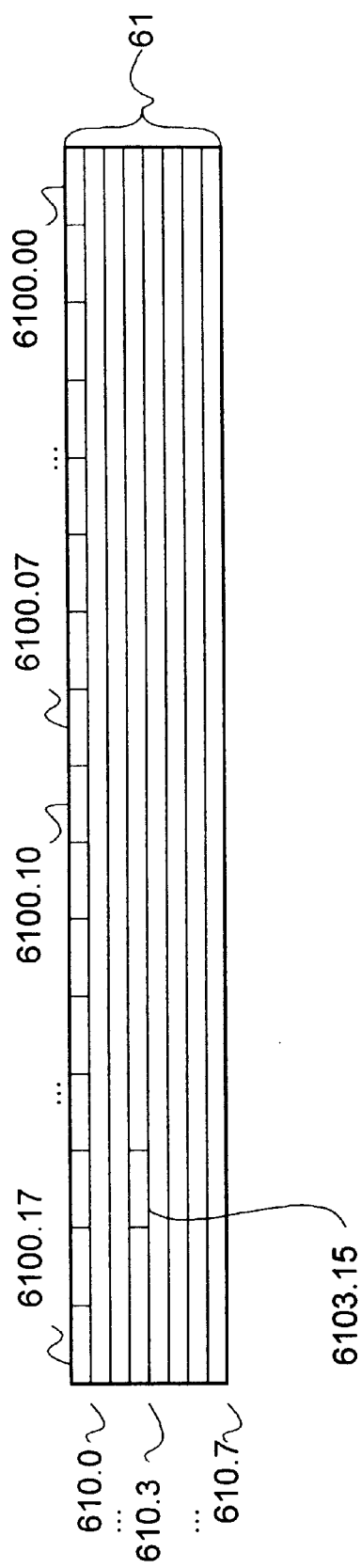
FIG. 6 is a schematic diagram illustrating an embodiment of a page 61 loaded into scalar data cache 240 as organized into cache frames, cache lines, and data words.

In the embodiment shown in FIGS. 2, 3, and 6, the data in cache array 240 (FIG. 2) are arranged as a plurality of frames 241.0–241.7 (each individually referred to as a frame 241), wherein each frame 241 holds data from one page 61 (FIG. 6). Each page 61 includes a plurality of cache lines 610, each cache line includes a plurality of data words 6100, and each data word comprises a plurality of data bits.

Referring to FIGS. 2 and 6, in one embodiment the data in cache array 240 are arranged as eight frames 241.0 through 241.7. Each frame 241 holds one page 61. Each frame 241 comprises eight cache lines; for example, frame 241.0 holds cache lines 610.0 through 610.7. Each cache line comprises 16 data words; for example cache line 610.0 comprises data words 6100.00 through 6100.07 and 6100.10 through 6100.17. (In the embodiment shown in FIG. 6, words within a cache line are numbered using an octal-based number, with the 16 words numbered 00 through 07, and 10 through 17.) Each data word comprises 64 data bits. In the embodiment shown in FIGS. 2, 3, and 6, each cache line is filled from an even 16-word logical-address boundary, and each frame 241 is filled from an even 8-cache-line logical-address page boundary (equivalent to an even 128-word logical-address boundary). In one embodiment, cache lines are loaded into a frame only on an asrequested basis; for example, if a fetch (say 6103.15 of FIG. 6) from the fourth cache line 610.3 of a page 61 were requested for data to be loaded into, e.g., an S register 120 of FIG. 1, then the fourth cache line 610.3 of the page 61 containing that data word would be placed into the fourth cache line of a frame 241.

Thus, the program's logical-address space 929 (see FIG. 12A) can be thought of as being divided into pages. Data at the end of one page are contiguous with, and related to the data at the beginning of the next sequential page. When data are fetched to a scalar register (e.g., one of A registers 130 or S registers 120) connected to scalar data cache 110, the logical-page data from a page 61 are mapped into a cache frame 241. Data from the page are fetched into the frame, one cache line at a time, as the data are requested. Since any logical page can be mapped into any available frame, data at the end of one frame may or may not be related to data at the beginning of the next frame in sequence.

In the embodiment shown in FIGS. 2 and 6, the physical cache array 240 can be thought of as arranged as eight frames. Referring to FIG. 2, frames 241.0 through 241.7 represent the eight frames. Each frame 241 is the exact size of one page 61, and each frame holds data from only one page at any one time. Some of the data from a page may not have been fetched into a frame; as data from a page are fetched and placed in their frame, the data are marked valid one cache line at a time. The frame can be thought of as the physical container which holds the data of the page. At different times, one particular page may be held within different frames. At any one time, one particular page can only be in one frame (i.e., one page cannot be held in two different frames at one time).

A greater or fewer number of frames, pages, cache lines per page, or data words per cache line may be used to advantage, and the invention is not limited to the numbers given in the example embodiments.

If a data word is in scalar data cache 110 of FIG. 1, a request for that particular data word results in a cache "hit"; if the requested data word is not in scalar data cache 110, the request results in a cache "miss". In the embodiment shown in FIG. 3, scalar data cache 110 is maintained such that if a cache miss occurs, then the entire cache line for the requested data word is fetched. In one embodiment the entire cache line is marked valid at once; other cache lines for that page are not requested until a miss is detected for a data word within one of those cache lines.

The term "translation" as used in this description is defined as the address-mapping operation wherein an address which points to data in one set of memories is mapped into an address in a different address space. For example, a logical address 350 might be used to point to data in a logical-address space 929 (see FIG. 12A) used by the compiler and the disk storage subsystem to track data and provide a flexible interface for programmers. The logical-address space 929 need not be physically represented anywhere. When program data are loaded into common memories 602, physical addresses 390 are used to locate the data. Therefore, the logical address 350 must be translated into a physical address 390 in order to fetch or store data from the physical-memory space 925 in the common memories 602. Similarly, when program data are loaded into cache array 240, a cache-array address 370 is used to locate the data. Therefore, the logical address 350 must be translated into a cache-array address 370 in order to fetch or store data from the cache address space in cache array 240.

In the embodiment shown in FIG. 1, a logical address 350 is "translated" by the digital logic hardware of common-memory interface 112 into a physical address 390 which is then used to access the data in common memories 602. In parallel, referring to FIG. 1, a cache access is attempted by cache controller 210 for fetches to registers which use scalar data cache 110. If a cache hit is detected, the access to the data in common memories 602 is cancelled.

The logic of cache controller 210 can also thus be said to comprise an "address translator" which translates logical address 350 into cache-array address 370. Such address translations provide a more flexible interface for programmers to use to access the data for instruction fetches, data fetches, or data stores.

Similarly, when a local copy of some of those data words is cached into scalar data cache 110, a cache-array address 370 must be generated. In the embodiment shown in FIG. 3, the logical addresses 350 are translated into cache-array addresses 370. In another embodiment, physical addresses 390 are translated into cache-array addresses 370. One motivation for translating logical addresses 350 (rather than translating physical addresses 390) is that the process of logical-to-physical address translation takes some amount of time, and it is desirable to start the cache access as soon as possible. By directly translating the logical address 350 to (a) determine the contents of the cache 240, (b) map to the cache-array addresses 370, and (c) access the data in the cache 240, the few extra cycles it would take to translate the logical address 350 into a physical address 390 (see FIG. 12A) can be saved.

For generality, the term "reference address" applies to whatever source address is used for a particular address translation, and can include logical addresses 350, virtual addresses, physical addresses 390, or real addresses, depending on the machine configuration and terminology used in a particular embodiment.

In an embodiment, such as shown in FIG. 3, which translates logical addresses 350 into cache-array addresses 370, and which re-uses logical addresses 350 from program-to-program (i.e., the same logical address 350 may be used by two different programs which run successively in processor 100 to refer to different and unrelated data), it may be desirable to start over with a fresh cache when programs are exchanged in CPU 100 of FIG. 1. In one such embodiment, scalar data cache 110 is entirely invalidated whenever a program is exchanged in CPU 100, in order to ensure that the subsequent program does not translate any of its addresses to point to stale data left over in scalar data cache 110 from the previous program.

FIG. 3 is a schematic diagram illustrating details of an embodiment of the invention showing elements of cache controller 210. In the embodiment shown in FIG. 3, logical address 350 (determined from the instruction which seeks to load a scalar register from memory) comprises sixty-four bits numbered $2^{63}$ (the most-significant bit, representing two to the 63rd power) through $2^0$ (the least-significant bit, representing two to the zero power). In the embodiment shown in FIG. 3, a forty-bit logical-reference address taken from logical address 350 is utilized, with the remaining most significant twenty-four bits (numbered $2^{63}$ through $2^{40}$) being ignored. In such an embodiment, the logical-reference address includes a thirty-three-bit logical-reference-page address 311 (bits numbered $2^{39}$ through $2^7$), a three-bit cache-line-select address 331 (bits numbered $2^6$ through $2^4$), and a four-bit word-select address 371 (bits numbered $2^3$ through $2^0$).

To access the data in scalar data cache 110, cache-array address 370 must be calculated (in effect, logical address 350 must be mapped onto (or translated into) cache-array address 370).

In the embodiment shown in FIG. 3, cache-array address 370 includes certain bits from the logical address 350, plus other bits calculated based on where data happen to be mapped in cache array 240 (FIG. 2). In one such embodiment, for example, word-select bits 371 (which comprise the bits $2^0$ through $2^3$) comprise the lower-order bits of cache-array address 370. Cache-line-select bits 331 comprise the next three low-order bits of cache-array address 370. In one such embodiment, cache array 240 of FIG. 2 includes eight frames, and thus the threebit frame address 322 (of a particular frame 241 of FIG. 2) comprises the highorder three bits of cache-array address 370. Frame address 322 is thus indicative of which LAPIC register 310 exactly compared to logical-reference-page address 311, and thus which frame 241 contains this page.

In the embodiment shown in FIG. 3, no more than one LAPIC register 310 can match any logical address 350 presented for translation. For example, cache frame address 322 corresponds to the address of the matching LAPIC register 310 which provided the one successful "compare" through the broadside page comparators 320. (Since a new LAPIC value is only loaded into a LAPIC register 310 if there is no match with any current LAPIC value, each LAPIC value is always different from all other LAPIC values, and thus there will be, at most, one successful compare.) Broadside page comparators 320 comprise eight separate page comparators, one for each LAPIC register 310; upon each data request for data to be loaded into an A register 130 or an S register 120, each comparator simultaneously compares the newly presented logical-reference-page address 311 to its particular LAPIC register 310.

If page-in-cache signal 321 indicates that none of the broadside compare pages hit, then the logical-reference-page address 311 from logical address 350 is loaded into the next available register of LAPIC registers 310. The indication of the next available LAPIC register 310 is provided by an oldest-page counter 360. When a logical-reference-page address 311 is loaded into LAPIC registers 310, the corresponding cache-line-validity bits 340 for all cache lines within that page are initially all "reset" to "invalid". When such an operation is performed, a cache-line-fetch command is sent to common memories 602 of FIG. 1 requesting sixteen data words for the corresponding cache line. When all sixteen data words requested for that cache line have been fetched and loaded into cache array 240 of FIG. 2, the corresponding cache-line validity bit is "set" to "valid". The destination A register 130 or S register 120 is then loaded with the appropriate data word from the cache line. Validity set/reset control 361 is used to "set" the cache-line validity bits 340 to "valid" as data become valid across an entire cache line. Every data word in a cache line must be valid before the cache line is marked valid. If one data word in a cache line becomes invalid, the entire cache line is marked invalid by validity set/reset control 361.

The logic of cache controller 210 as described above can also thus be said to comprise: a "cache-hit detector" which determines whether a data word corresponding to the requested reference logical address 350 is currently held in scalar data cache 110, and indicates such through control signals, e.g., 321, 323, 332, and 333; a "cache-load controller" which controls the loading and storing of data from common memories 602 to cache array 240 across data path 250 of FIG. 2; a "cache accessor" which provides fetch and store-through access to scalar data cache 110 for instructions or operations to A registers 130 and S registers 120; and a "cache-data invalidator" which invalidates data held in the cache corresponding to addresses in common memories 602 which are stored to from V registers 160 of FIG. 1.

Figure 4:
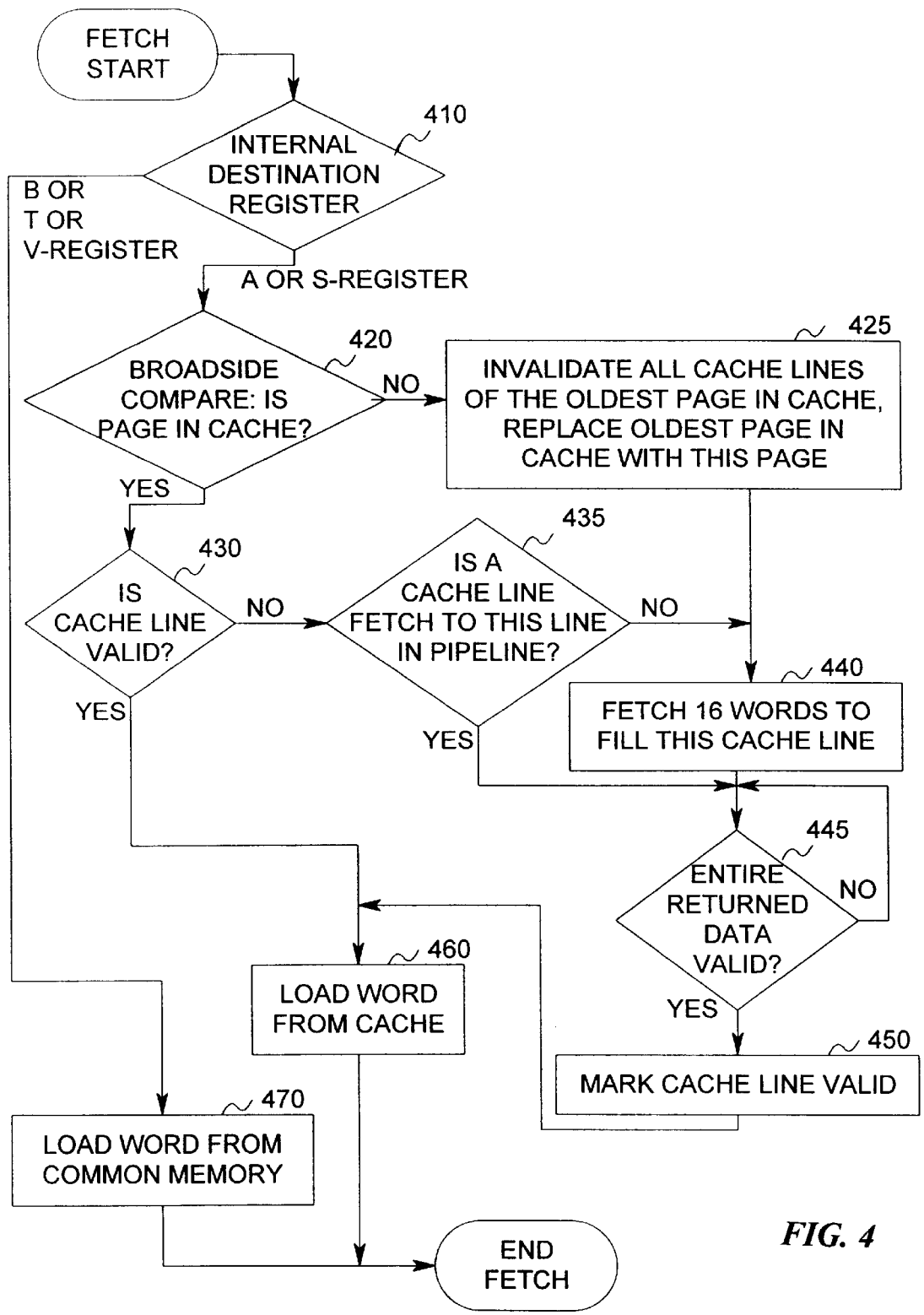
FIG. 4 is a flow chart illustrating the cache fetch process.

FIG. 4 is a flowchart illustrating the fetch process. At block 410 of FIG. 4, a test is made to determine the internal destination register of the fetch. If the internal destination register is a vector V register 160, or a B register 150, or a T register 140, control is passed to block 470. At block 470, the appropriate vector 160 or B register 150 or T register 140 is loaded from common memory 602, and control passes to the end of the fetch process.

If the internal destination register at block 410 is an A register 130 or an S register 120, control is passed to block 420. At block 420, a broadside compare is performed to determine whether the page is in cache; if the page is in cache, control is passed to block 430; otherwise, if the page is not in cache, control is passed to block 425. At block 425, the processor invalidates all cache lines of the oldest page in cache, and replaces the oldest page in cache with this new page. In other words, and referring to FIG. 3, the LAPIC register 310 pointed to by oldest page counter 360 is replaced with the logical-reference-page address 311 from this logical address 350. Referring again to FIG. 4, control is then passed to block 440. At block 440, 16 words of this cache line are fetched from common memories 602. In the embodiment shown in FIG. 3, this fetch is performed 8-words-at-a-time into the appropriate cache line.

If the broadside compare in block 420 indicates that the page is in cache, then control had passed to block 430. At block 430, a test is made to determine whether the particular cache line within this page is valid. If the cache line is valid, control is passed from block 430 to block 460. At block 460, the appropriate A register 130 or S register 120 is loaded from cache, and control passes to the end.

If, at block 430, the cache line is found to be invalid, control passes to block 435. At block 435, a test is made to determine whether a cache fetch to this line is currently "in the pipeline". ("In the pipeline" means the fetch request has been issued but the requested data has not yet arrived at the requested destination. In one embodiment, there are a plurality of pipeline stages in both the "outgoing" path for the fetch request to common memories 602, and in the "incoming" path for data from common memories 602, and it thus takes a plurality of clock cycles between the departing fetch request and the arriving data.) If the fetch is in the pipeline, control is passed to block 445, since no additional fetch is required. If the fetch is not currently in the pipeline at block 435, control is passed to block 440 and 16 words of this cache line are fetched. Control then passes to block 445.

At block 445, the processor waits for the returned data in the cache line to become valid. If the cache line is valid, control is passed to block 450. If the data are not yet valid, control is passed back to block 445. At block 450, the entire cache line is marked valid once all 16 data words in that cache line are present and valid, and control passes to block 460. At block 460, the appropriate A register 130 or S register 120 is loaded from cache, and control passes to the end of the fetch process.

Figure 5:
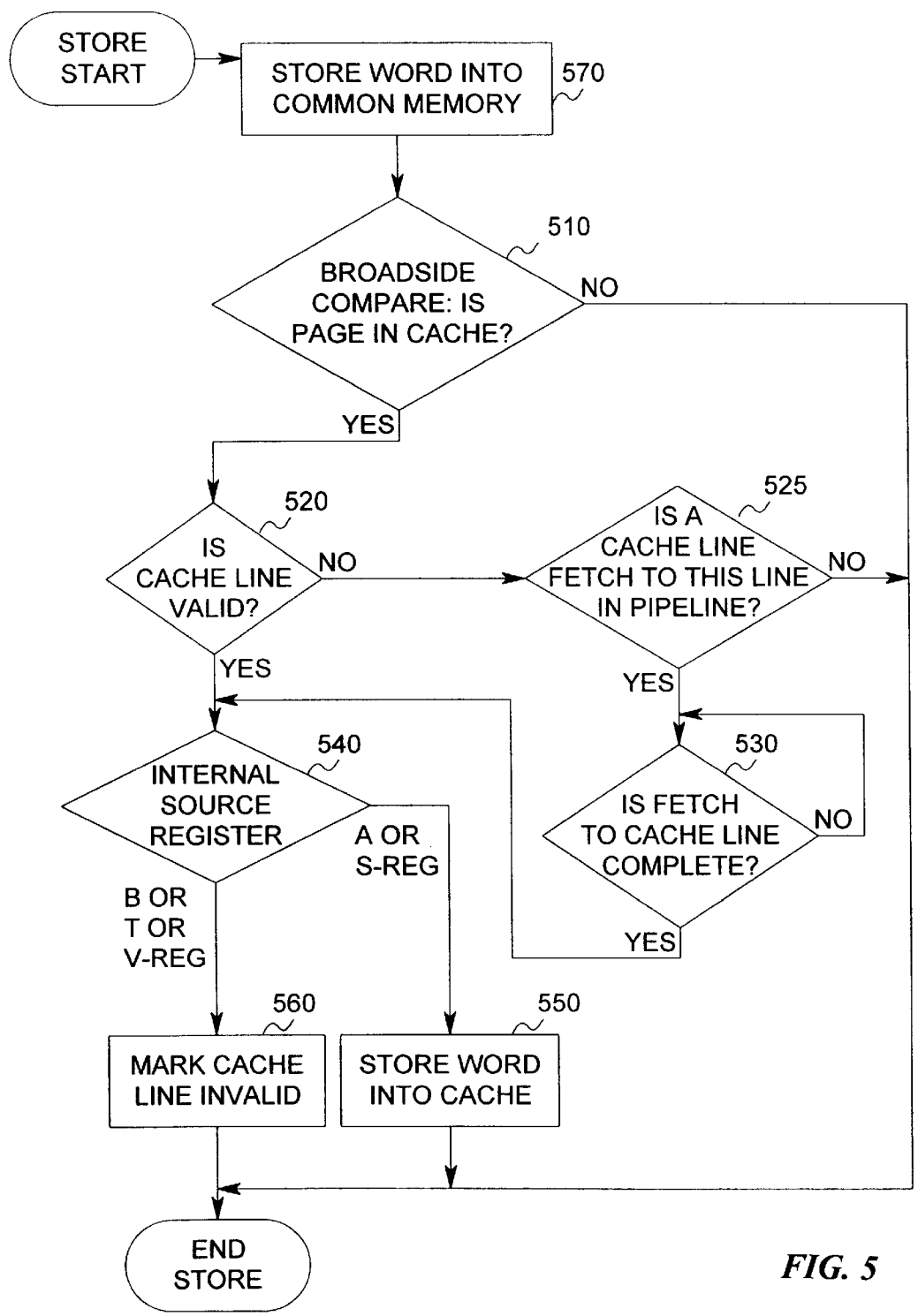
FIG. 5 is a flow chart illustrating the cache store process.

FIG. 5 is a flowchart illustrating the write (i.e., store) process. In FIG. 5, the start of the store passes control to block 570, where the word is stored into common memories 602, and control passes to block 510. At block 510, a broadside compare is performed to determine whether the requested logical-address page is in cache. If so (the broadside compare determined that the page is in cache), control is passed to block 520; otherwise, the store is complete.

At block 520, a test is made to determine whether the cache line is valid. If the cache line is not valid, control is passed to block 525. At block 525, a test is made to determine whether there is a cache-line fetch in process to this cache line inside the pipeline. If not, the store is complete; otherwise, if, at block 525, it is determined that there is a cache-line fetch to this cache line inside the pipeline, control is passed to block 530.

At block 530, the processor waits for the cache-line fetch in the pipeline to complete, and control then passes to block 540.

If, at FIG. 520, the cache line is determined to be valid, control is passed to block 540. At block 540, a test is made to determine which internal source register is being requested for this store. If the internal source register is a vector register, or a B register, or a T register, or an A register with a bypass operation, or an S register with a bypass operation, then control is passed from block 540 to block 560. At block 560, the cache line is marked invalid and the store is complete. If, at block 540, the internal source register was determined to be an A register or an S register, control is passed to block 550. At block 550, a write operation is performed to store the contents of the appropriate A register or S register into the cache line, and the store operation is complete, thus having performed a write-through function relative to scalar data cache 110.

A significant performance limitation in a multiprocessor system is processor "lockout", or "blocking", which may occur when multiple processors are sharing common resources. Conflicts due to this sharing can be minimized if copies of shared data are stored in local memory. Further performance enhancements are possible if the data cache is constructed to pipeline fetches from a series of consecutive data words in common memory, such that the processor can operate on the cached data values, and allow other processors to access other areas in the common memory which do not overlap or contend for the cached area. Programming in a supercomputer system often communicates the request of one processor to use a data resource out of common memory by using semaphores or other processes. Processor idle time can be minimized by allowing each processor to operate out of its own locally cached memory.

Computer processing speed and efficiency in both scalar and vector machines can be increased through the use of multiprocessing techniques.

Multiprocessing involves the use of several or perhaps even thousands of processors sharing common system resources, such as main memory. Independent tasks of different jobs, or even related tasks of a single job may be run in parts on the various multiple processors. Each processor obeys its own set of instructions, and the processors execute their instructions in parallel. By increasing the number of processors and operating these processors in parallel, more work can be done in a shorter period of time. In the embodiment shown in FIG. 1, each CPU 100 has a separate scalar data cache 110. Scalar data cache 110 is separate from, and in addition to, instruction buffers 170. Scalar data cache 110 is used to accelerate data access for load requests to A registers 130 and S registers 120. The organization of scalar data cache 110 in one such embodiment is:

1024 64-bit data words;

8 fully-associative pages (all pages are searched for a valid address match at the same time);

8 cache lines per page. Within a page, each line is loaded separately and only when a cache miss for that line is encountered;

16 data words per cache line (and thus, 16 data words/line×8 lines/page×8 pages=1024 words).

In the embodiment shown in FIG. 3, a cache hit is determined using logical, not physical, addresses. A hit occurs when a valid page address consisting of address bits $2^7$ through $2^{39}$ held within the LAPIC 310 in scalar data cache 110 match the corresponding bits of logical-reference-page address 311 of the logical reference (logical address 350) of a memory request from an instruction for data to be loaded into A registers 130 or S registers 120, and the cache line 610.n indicated by bits $2^4$ through $2^6$ (reference numeral 331) of the requested logical address 350 is found valid and within scalar data cache 110.

In the embodiment shown in FIG. 1, only A register 130 and S register 120 load requests can be satisfied from scalar data cache 110. A register 130 and S register 120 load requests that "miss in scalar data cache 110" (do not match a valid cache line), cause a cache line of sixteen data words to be requested from memory into scalar data cache 110. Only A register 130 and S register 120 load requests can start a cache-miss sequence. (Referring to FIGS. 2 and 6, a "cache-miss sequence" is the series of functions performed to allocate (if needed) a frame 241 in scalar data cache 110 for a page 61 which contains a data word 6100 corresponding to the requested reference address, and to fetch the corresponding cache line 610 within that page 61, and to mark the cache line 610 as "valid" when its data arrive into scalar data cache 110.) A register 130 and S register 120 write requests are written-through. The cache word is updated if there was a cache hit on a write request. If the write address missed the cache, no cache line is requested.

In FIG. 1, B register 150, T register 140, and V register 160 write requests cause corresponding cache lines to be invalidated on a hit (and no cache-miss sequences are initiated). B register 150, T register 140, and V register 160 write requests have no effect on the cache if a cache miss is detected (since nothing is to be invalidated). B register 150, T register 140, and V register 160 load requests have no effect on the cache, regardless of cache hit or cache miss.

If a cache miss from an A register 130 or S register 120 load request has matched a page address but the corresponding cache line in the page is not valid, then the corresponding 16 words for that cache line are requested, and the cache line is set "valid" within the cache when the data are returned to the cache from the common memories 602.

If a cache miss from an A register 130 or S register 120 load request has not matched a page address, a cache-miss sequence is started, wherein the corresponding line is requested from memory and the oldest page address in the cache is replaced by the new page address, with all cache lines initially marked "invalid". As the new cache-line data are returned, the new page address is validated, as is the corresponding cache line 610 of FIG. 6. The other cache lines 610 of the page 61 are not requested, and remain invalid (see the replacement policy discussion, below.)

In one embodiment, during an exchange sequence (an "exchange sequence" is the series of functions involved in exchanging program tasks or jobs in CPU 100), the entire scalar data cache 110 is reset to "invalid". (This feature is included in this embodiment because a logical address 350 is used, not a physical address 390, and thus different tasks which happen to use the same logical address 350 for different data should not result in a cache hit from data left in scalar data cache 110 from a previously running task.)

The cache is non-blocking. This means that a cache miss (for which a cache line 610 is requested from common memories 602) does not stop further scalar memory requests. In one embodiment, up to four misses can be outstanding (inprocess) simultaneously. A fifth miss sets conditions to block further instructions which access common memories 602 from issuing, and blocks this operation (execution is held-off of the instruction which made the request which caused the fifth miss) until at least one of the four earlier missed cache lines has become valid within scalar data cache 110. Each cache miss is considered separately. Thus, if a succeeding request is for a cache line 610 for which a cache-miss sequence is already in progress, that request is a separate miss, and takes one additional place in the list of outstanding misses. (However, to the performance counter that is counting cash hits, the succeeding load or store request is considered as a "hit", even though the cache line is not yet valid.)

Figure 8:
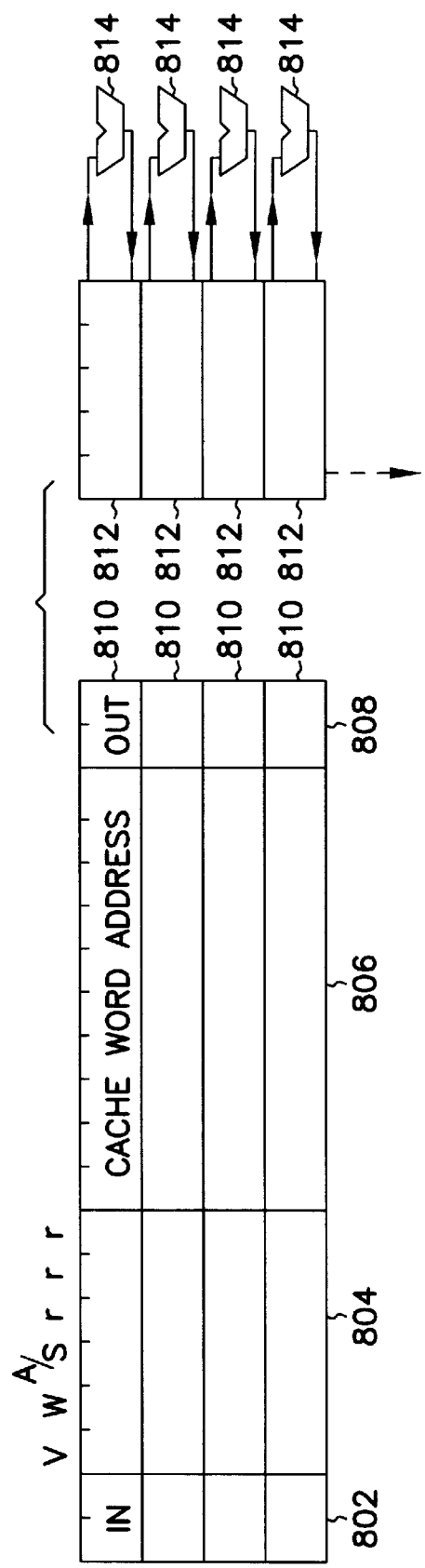
FIG. 8 is a schematic diagram illustrating an embodiment of outstanding cache-miss activity tracking registers.

One embodiment a system which can handle up to four simultaneous outstanding cache-miss activities is shown in FIG. 8. FIG. 8 is a schematic diagram illustrating an embodiment of outstanding cache-miss activity tracking registers. In the embodiment shown, each outstanding cache miss activity is monitored with one of four activity registers 810, each of which includes two bits of "in-status" 802, two bits of "out-status" 808, a ten-bit cache-word-address field 806, and 6 bits of register status 804. Register status 804 includes a valid bit to indicate that this activity register 810 is valid for an outstanding activity, a write bit which is "set" if the outstanding activity is a write operation, an A/S bit which is "reset" if the corresponding register is an A register 130 and "set" if the corresponding register is an S register 120, and 3 bits indicating which A register 130 or S register 120 is involved. Corresponding to each activity register 810 is a counter register 812 and an incrementor 814, used to count the number of data words which have returned from common memories 620 to a particular cache line 610 as indicated by the upper-order six bits of cache-word address 806 for this activity register 810. When counter register 812 indicates that sixteen words have returned for this cache line 610 (i.e., the entire cache line 610 is valid), then the corresponding cache line validity bit 340 is "set" to indicate the entire corresponding cache line 610 is "valid"; the register status 804 and cache word address 806 of this activity register 810 are used to control the completion of the activity, e.g., register status 804=binary 100 001 and cache word address 806=binary 00000 01111 might specify the loading of A register 130 number one from cache array 240 word number fifteen, once the entire cache line 610 was valid. In one such embodiment, where a scalar store operation followed closely by a cache line load operation, the common memory interface 112 guarantees that the store completes before the cache line load is done; where a cache line load operation is followed closely by a scalar store operation, the write-through-cache function is performed by first fetching an entire cache line 610, and then storing the A register 130 or S register 120 word into common memories 602, waiting for the cache line fetch to complete, and then also storing that data word to the corresponding location in the now-fetched cache line 610. In one such embodiment, only one outstanding write operation is allowed in the set of activity registers 810 in order to simplify conflict resolution (however, in one embodiment a second write operation is allowed to be in the pipeline 174 between the instruction buffers 170 and the set of activity registers 810; this second write operation will cause the instruction issue hardware 172 to stop issue of any further load or store operations until the completion of the first write operation in the activity registers, which then can accept the second write operation from the pipeline).

In one such embodiment, data words return from common memories in a temporally non-deterministic pattern. To accommodate this, each outgoing read command is accompanied by a destination code, and each word of returning data is accompanied by that destination code to specify where the data word is to be placed. In one such embodiment as shown in FIG. 9, a fourteen-bit destination code is used. For example, each cache read data word returning from common memories 602 to be placed in cache array 240 has three high-order bits of binary 111, and ten low-order bits (i.e., "Word #") indicating which word in cache array 240 is to be written. Similarly, each V-register-read data word returning from common memories 602 to be placed in a vector register 170 has three high-order bits of binary 110, three middle bits (i.e., "Register #") indicating which V register 170 and seven low-order bits (i.e., "Element #") indicating which element in the specified V register 170 is to be written. The other possible destinations are similarly encoded, as shown in FIG. 9.

Figure 10:
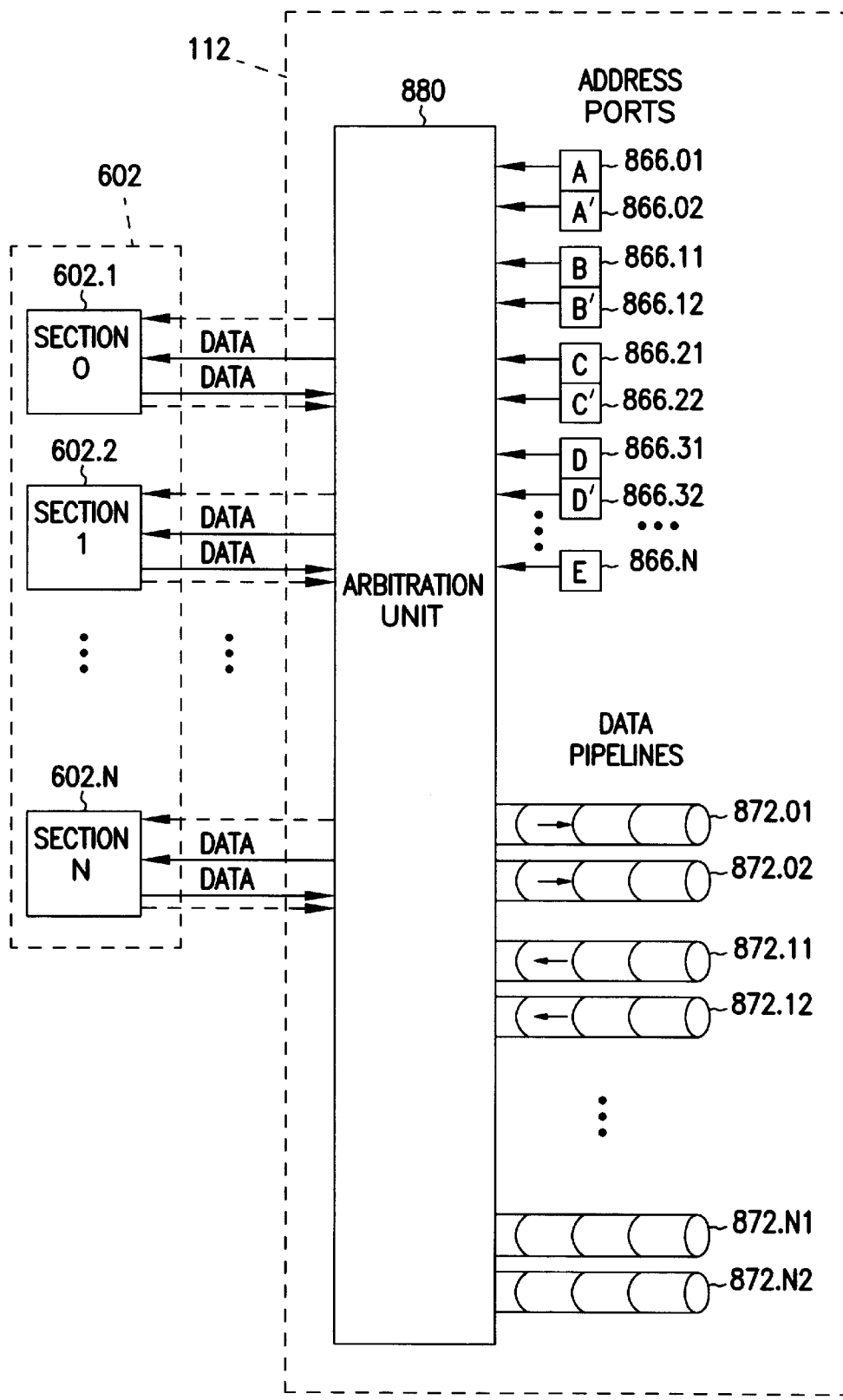
FIG. 10 is a schematic diagram illustrating an embodiment of common-memory interface 112.

In one embodiment, as shown in FIG. 10, common memories 602 are partitioned into N memory sections 602.1 through 602.M. In one such embodiment, each section 602.i is further partitioned into a plurality of banks. The interface between common-memory interface 112 and each memory section 602.i (where i is 1 through M) includes an address/control port which specifies a memory address and controls the function of the memory section 602.i, a data-out port for writing data to the memory section 602.i, and a data-in port for reading data from the memory section 602.i. In one such embodiment, M represents eight sections. In one such embodiment, the interface between common-memory interface 112 and processor 100 includes a plurality of address ports 866.01 through 866.N, plus a plurality of data-out pipelines and data-in pipelines, each data pipeline having 64 data bits. In one such embodiment, there are four pairs of address ports plus one single address port, wherein each pair (e.g., address port A 866.01 and address port A' 866.02) is operable to provide a pair of addresses at each successive clock cycle. In this embodiment, address port A 866.01 provides the addresses for data words being loaded into even-numbered vector elements in a V register 170, and address port A' 866.02 provides the addresses for data words being loaded into odd-numbered vector elements in a V register 170. Similarly, address port B 866.11 provides the addresses for data words being loaded into even-numbered vector elements in a V register 170, and address port B' 866.12 provides the addresses for data words being loaded into odd-numbered vector elements in a V register 170. Address port C 866.21 provides the addresses for data words being stored from even-numbered vector elements of a V register 170, and address port C' 866.22 provides the addresses for data words being stored from odd-numbered vector elements of a V register 170. Address ports D 866.3 and D' 866.32 provide the addresses for data words being loaded into instruction buffers 170, being transferred to or from input/output (I/O) ports, or being exchanged as part of a task swap. Address port E 866.N provides the addresses for data words being loaded into or stored from scalar cache 240. Data pipelines 872.01 through 872.N2 convey data to or from arbitration unit 880 from or to the internal registers of processor 100.

In one such embodiment, a cache line 610 of 16 data words is always fetched from a modulo-16-word memory-address boundary. A cache-line-read operation is kicked off as two sequential sets of eight parallel read operations from arbitration unit 880, with one of the eight parallel read operations going to each of the eight memory partitions, on each of two consecutive clock cycles. A single request cycle on address port E 866.N is used to request all sixteen data words. Requested data can return from the eight partitions in a temporally non-deterministic pattern, accompanied by corresponding destination codes which specify the appropriate addresses in cache array 240, as described above. In one embodiment, common-memory interface 112 receives incoming data from up to eight sections of common memory 602.i simultaneously, arbitrates between the data and streams the data into two or more parallel port pipelines to the various destinations. In one such embodiment, one data pipeline feeds even-numbered elements of V registers 170, and another data pipeline feeds the odd-numbered elements of V registers 170; and one data pipeline feeds even-numbered elements of cache array 240, and another data pipeline feeds the odd-numbered elements of cache array 240, thus allowing up to two data words to be loaded per clock cycle per pair of pipelines. Since the sixteen data words requested from the eight memory partitions for a cache line can arrive out-of-sequence, with data from some sections arriving before data from other sections, this arbitrating and streaming of the data to the destinations helps reduce the total time needed to load a cache line 610.

FIG. 11A is a schematic diagram illustrating an embodiment of a generalized logical-address translator 890 according to the present invention. Logical-address translator 890 includes a plurality of segment-register sets 872.1 through 872.N, a plurality of segment detectors 874.1 through 874.N, a plurality of address translators 876.1 through 876.N, and translation controller 878. Each one of the plurality of segment-register sets 872.1 through 872.N holds values which specify address limits and translation mapping of a corresponding logical segment. Each one of the plurality of segment detectors 874.1 through 874.N is coupled to a corresponding one of the plurality of segment-register sets 872.1 through 872.N, wherein the segment detector operates to determine whether the logical address 350 is within the specified address limits of the corresponding logical segment. Each one of the plurality of address translators 876.1 through 876.N is coupled to a corresponding one of the plurality of segment-register sets 872.1 through 872.N, wherein the address translator operates to translate the logical address 350 into a physical address 390. Translation controller 878 is connected to the plurality of segment detectors 874.1 through 874.N and the plurality of address translators 876.1 through 876.N, wherein the translation controller operates to output one of the translated physical addresses 390 if the corresponding segment detector determines that the logical address 350 is within the specified address limits of the logical segment;

Each logical-address segment supported by logical-address translator 890 is controlled by one segment-register set 872, which is coupled to the corresponding comparator 874 and address translator 876.

Figure 11B:
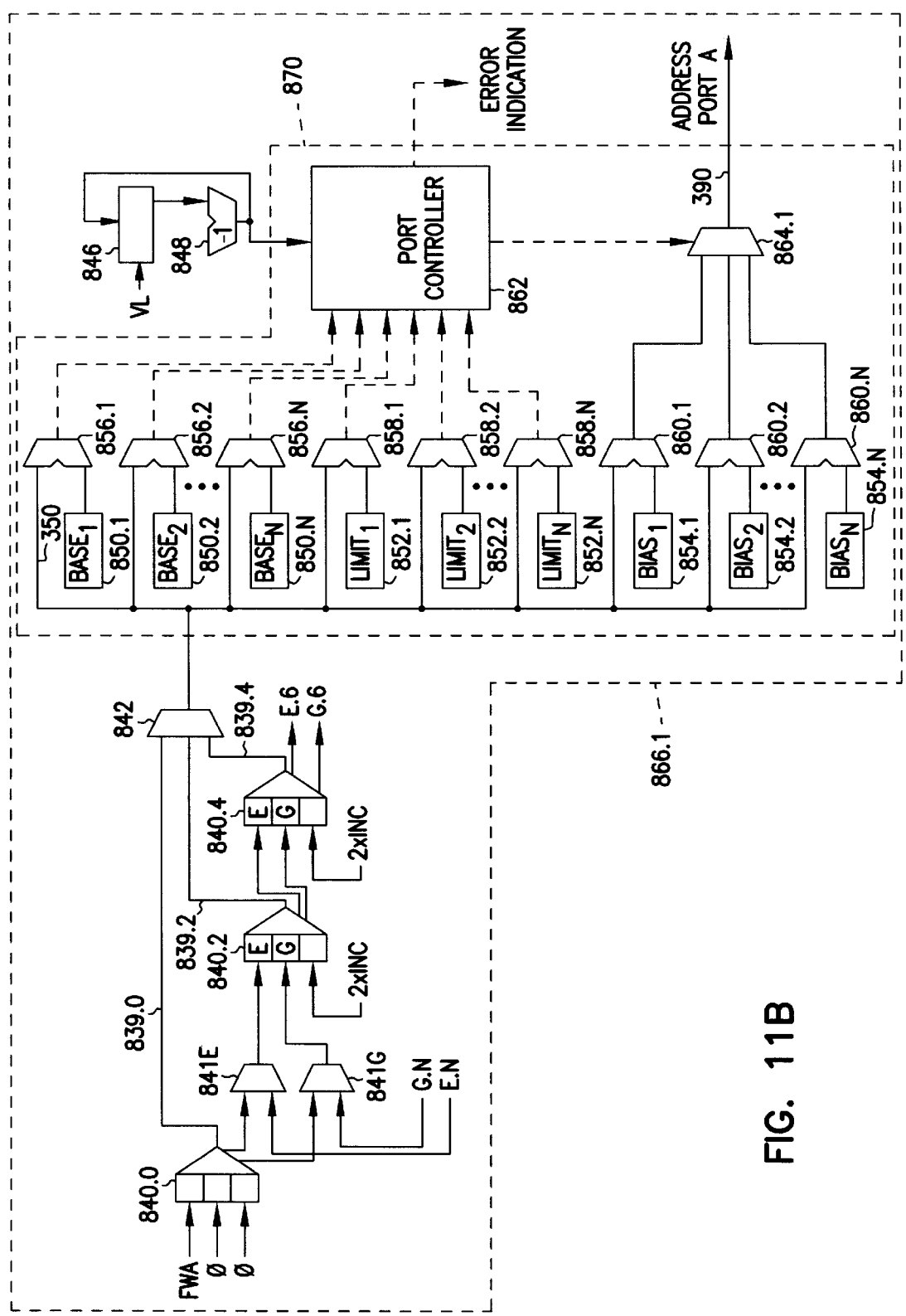
FIG. 11B is a schematic diagram illustrating an embodiment of an address port A 866.01 with logical-address translation.
Figure 11C:
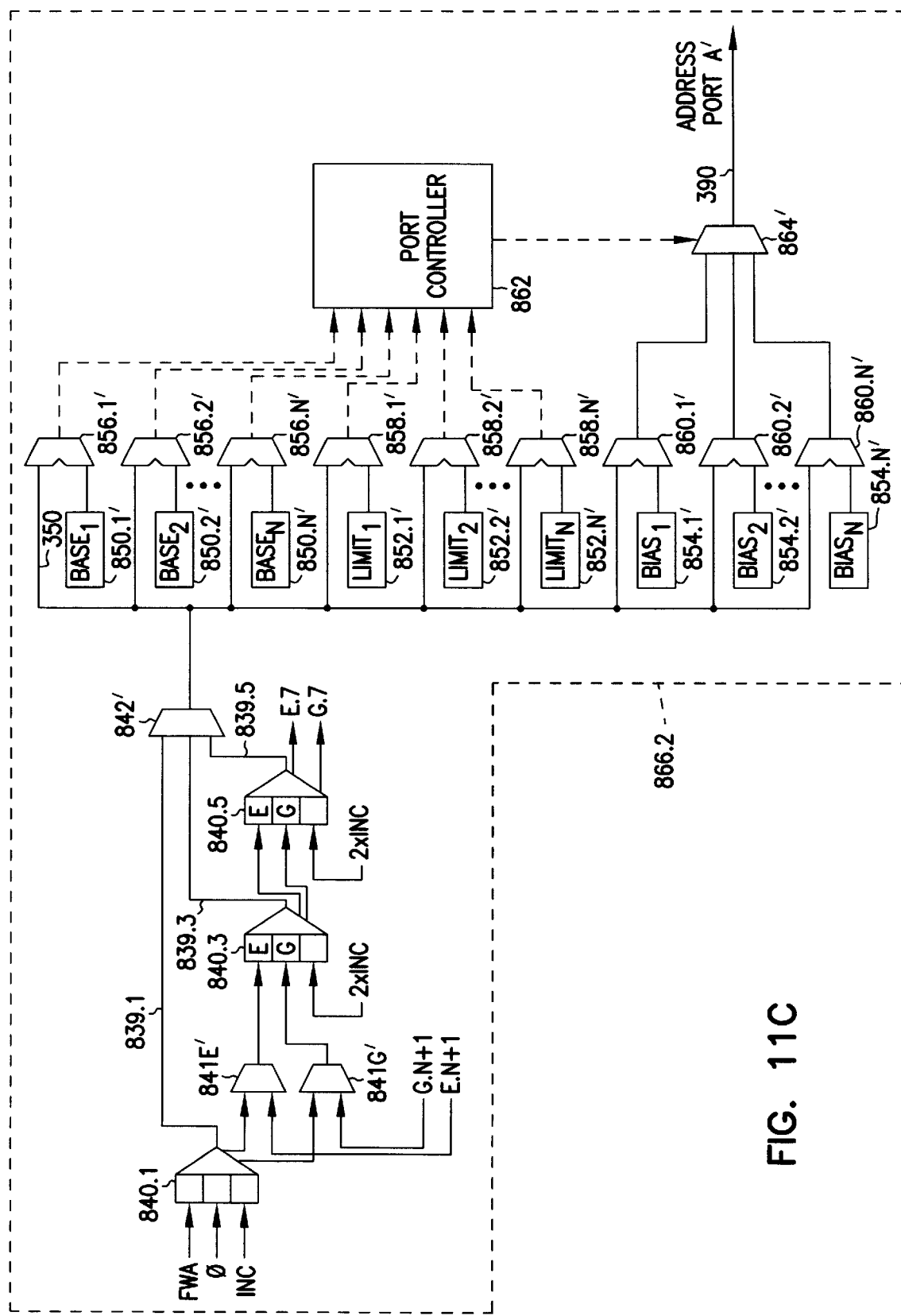
FIG. 11C is a schematic diagram illustrating an embodiment of an address port A' 866.02 with logical-address translation.

FIG. 11B is a schematic diagram illustrating an embodiment of an address port A 866.01 of FIG. 10 with logical-address translation. FIG. 11C is a schematic diagram illustrating an embodiment of an address port A' 866.02 of FIG. 10. Referring to FIG. 11A, the first word address ("FWA") (for example, the address of the word containing the first element of a vector which is to be loaded into a V-register 170) is coupled to the input of an adder 840.0, along with zero carry-in and zero element increment. (An "element increment" is the difference between addresses of successive elements in a vector image in common memories 602.) Adder 840.0 produces three outputs: the "enable" output coupled to multiplexor 841E and "generator" output coupled to multiplexor 841G, which are in turn coupled to the enable and generator inputs, respectively, of adder 840.2, along with the memory address 839.0 (of the first element of the vector—element number zero) coupled to multiplexor 842. (Enable/generator signals are sometimes called carry/satisfy or P/G terms.) If only a single address is desired from this address port (e.g., the address for one cache line or a single register data word to be accessed), then only the single address 839.0 is used. The generation of the complete memory address 839.0 generally takes longer than the generation of the enable and generator signals. By coupling enable and generator signals to successive stages of the element address adders 840.i, those adders can start their addition operations for generating the addresses of successive elements before the complete result of the previous stage has been generated. Adder 840.2 takes the enable/generator outputs from the previous stage, and adds two times the element increment (the address difference between successive elements in the vector image in memory) to generate the address of the third element of the vector (element number two). Similarly, adder 840.4 takes the enable/generator outputs from the previous stage, and adds two times the element increment to generate the address of the fifth element of the vector (element number four). At some point in the chain of element address adders 840.0 to 840.N, the enable/generator signals are fed back to multiplexors 841E and 841G in order that addresses for successive elements may be generated from the addresses of previous elements. This is done at a point in time when adder 840.2 has completed its generation and transferal of the address for element number 2, and therefore is free to generate some later address. For example, in one embodiment, signals E.6 and E.6 are fed to the E.N and G.N inputs of multiplexors 841E and 841G, respectively. On successive clock cycles, successive even-element addresses are thus fed to multiplexor 842.1, since two element increments are added to each successive address generated. In one such embodiment, multiplexor 842.1 feeds base comparators 856.1 through 856.N, limit comparators 858.1 through 858.N, and bias adders 860.1 through 860.N in parallel. In one such embodiment, this N is three: three logical-address segments for each address port are provided for by three sets of base, limit, and bias registers and the corresponding comparators and bias adders. Port length register 846 and port length decrementor 848 are initially loaded with a vector length count of the number of elements to be processed at the start of a vector operation. An indication of the remaining vector-length count in port length register 846 is coupled to port controller 862. An indication of the results of the comparisons from base comparators 856.1 through 856.N and limit comparators 858.1 through 858.N are also coupled to port controller 862.

Port controller 862 uses this information to control port output multiplexor 864.1 to select the proper physical address 390 to output from the port.

FIG. 11B illustrates an embodiment of an address port A' 866.02 which is similar to FIG. 11A, except that the first word address ("FWA") is coupled, along with one element increment, to the input of adder 840.1. Adder 840.1 produces three outputs: the enable output coupled to multiplexor 841E' and generator output coupled to multiplexor 841G', and memory address 839.1 (of the second element of the vector—element number one) coupled to multiplexor 842'. Thus address port A' 866.02 generates successive odd-element addresses, since two element increments are added to each successive address generated, starting with the address of element number 1. On each successive clock cycle, address port A 866.01 and address port A' 866.02 (which share port controller 862) generate a pair of addresses, one address for an even element, and one address for an odd element.

Figure 12A:
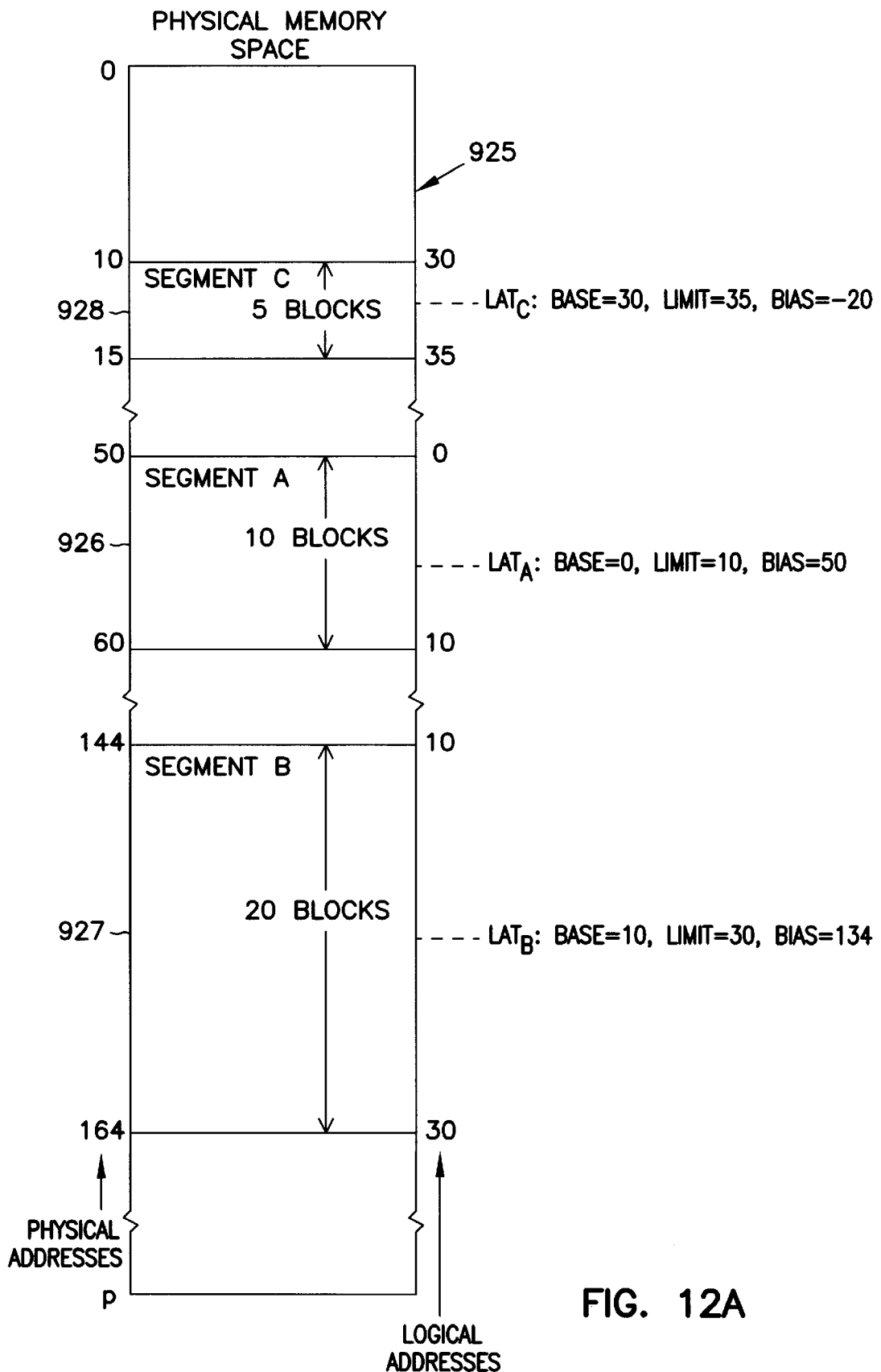

FIGS. 12A, 12B and 12C together form a diagram illustrating an embodiment of the translation of a logical address 350 into a physical address 390. Logical addresses 350 are used to simplify the generation of programs. Processor 100 typically has a plurality of programs simultaneously loaded into common memories 602, and time-multiplexes among these programs. Physical-memory space 925 represents the address space across common memories 602. In one embodiment of processor 100, programs are loaded and remain in their entirety in physical-memory space 925 before they can be run. If programs must be placed into just one or two segments in physical-memory space 925, the memory-manager program must find or provide a contiguous space in physical-memory space 925 for each such large segment. If no space large enough can be found, programs in physical-memory space 925 must be swapped out to mass storage (such as disk storage) in order to make room. In order to provide finer granularity and ease the task of memory management, a program is subdivided into smaller pieces. One conventional method of doing this is to provide a large number of page-sized divisions of a logical-address space, and map these onto equal-sized page frames in a physical-address space—typically a time-consuming process.

In contrast, the present invention instead divides the logical-address space 929 into a plurality of variable-sized segments. In one such embodiment, each segment is specified to be a whole number of blocks, where a block is defined as 16,384 ($2^{14}$) words. Other embodiments use different block-size granularities. FIGS. 12A, 12B and 12C together form a program divided into three memory segments: memory segment 926 which is ten blocks long, memory segment 927 which is twenty blocks, and memory segment 928 which is five blocks. This program has a logical-address space 929 having logical addresses 350 going contiguously from zero to 35 blocks. All logical addresses 350 generated for this program must have values greater than or equal to a base of zero, and less than a limit of 35 blocks, and are tested by processor 100 to be within these base-limits. In order to facilitate placement into physical-memory space 925, the program is divided into three memory segments 926 through 928. The overall base-limit of zero to 35 is also subdivided correspondingly. Memory segment 926 is placed into physical-memory space 925 from physical block 50 to physical block 60, and has a base=0 and limit=10. Memory segment 927 is placed into physical block 144 to physical block 164, and has a base=10 and limit=30. Memory segment 928 is placed into physical block 10 to physical block 15, and has a base=30 and limit=35. Each block of the program is now placed at an address which can be calculated by subtracting the logical block number from the logical address 920 and then adding the physical block number. Rather than doing this calculation in two steps for each address generated, a physical bias 922 is precalculated (to be the physical block number minus the logical block number) by the memory manager and used for every address within a particular memory segment. Since all addresses within a memory segment start on a whole block address boundary, the word number (the low-order bits of the address) are used unchanged from the logical address 350.

Figure 12D:
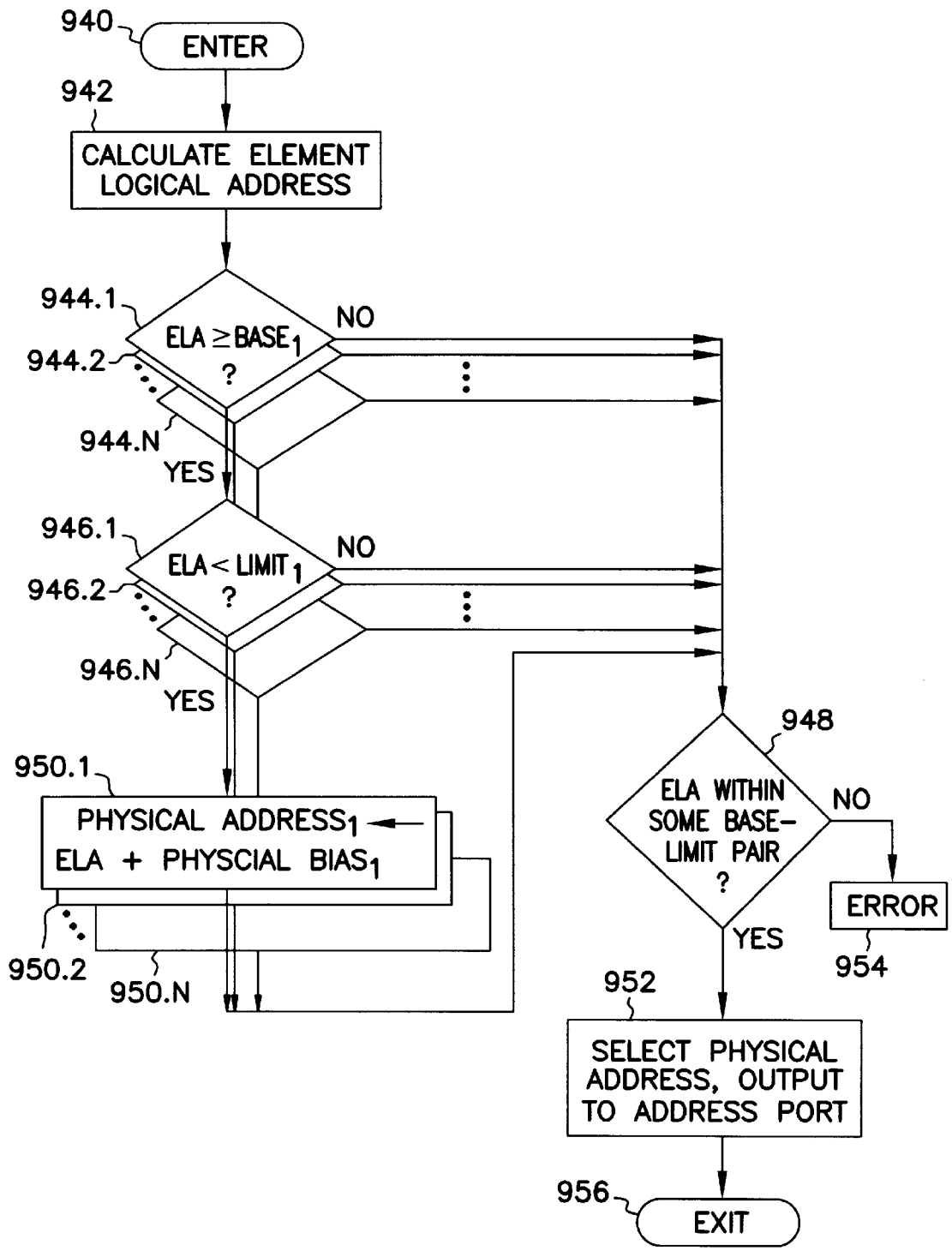
FIG. 12D is a flow chart illustrating an embodiment of the control for an address port A.

FIG. 12D is a flow chart illustrating an embodiment of the control for an address port A 866.01 of FIG. 11A. The flow chart is entered at point 940 and control passes to block 942. At block 942, an element logical address ("ELA") 839 is calculated, and control passes to a plurality of decision blocks 944.1 through 944.N. In one embodiment, blocks 944.1 through 944.N, 946.1 through 946.N, and 950.1 through 950.N are executed simultaneously to determine whether the ElA is greater than or equal to each of the base addresses 850.1 through 850.N, and less than each corresponding limit addresses 852.1 through 852.N, and to calculate the physical addresses 390 by adding the ELA to each corresponding physical bias 854.1 through 854.N. If the ELA is not within one of the base-limit pairs, then control passes from block 948 to error-reporting block 954; otherwise control passes to block 952, where the proper physical address 390 is selected, and it is output from address port A 866.01. Control then passes to exit point 956.

Figure 13B:
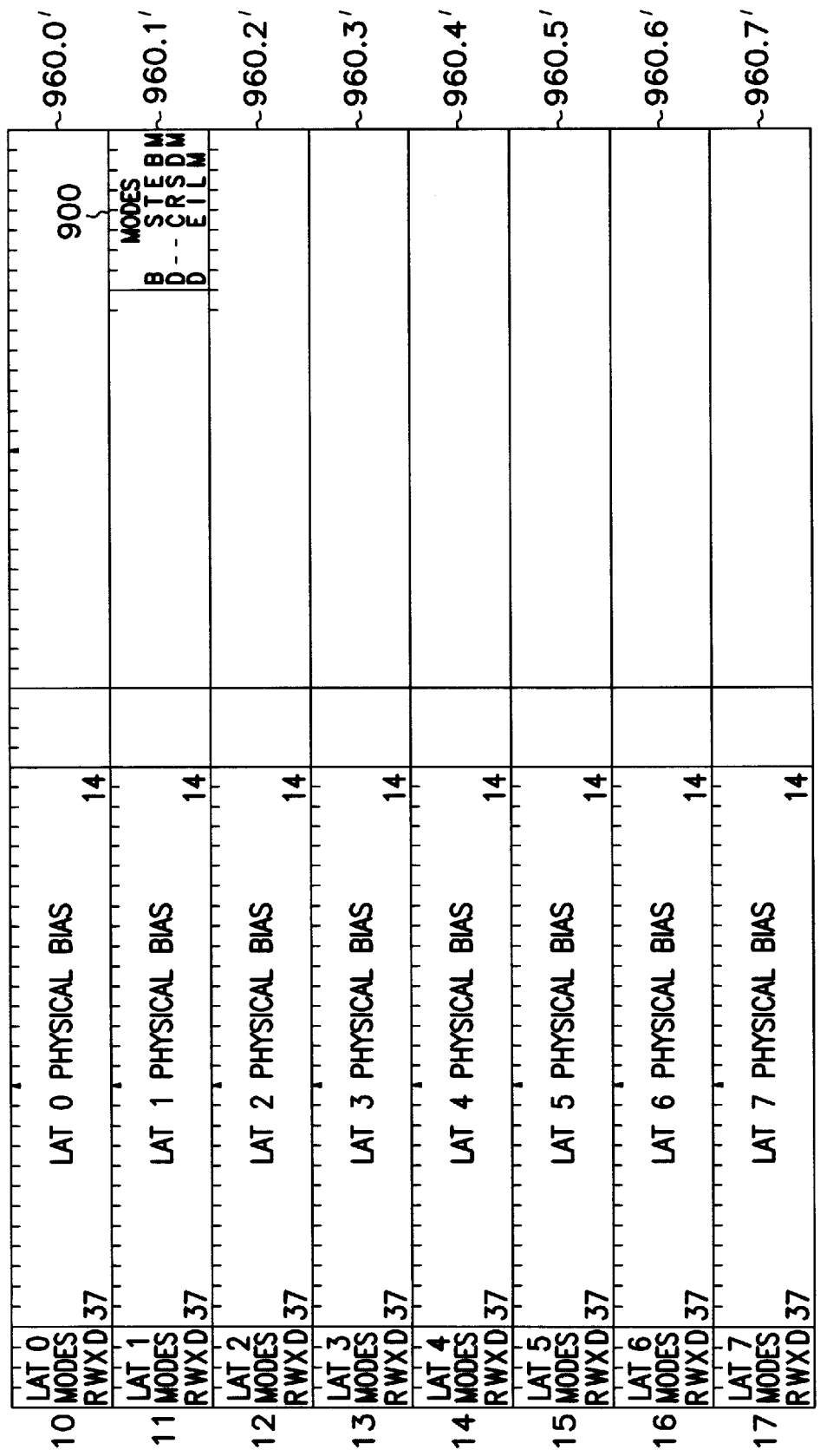
FIG. 13 consists of FIGS. 13A and 13B, and is a schematic diagram illustrating an embodiment of a logical-address table.

FIG. 13 consists of FIGS. 13A and 13B, which can be placed next to one another to form one drawing, and is a schematic diagram illustrating an embodiment of a logical-address table ("LAT") within an exchange package 980. An exchange package 980 is used as a source and a destination to exchange the internal state contents of the processor at a task swap. In the embodiment shown, there are 32 words, each 64 bits wide in an exchange package 980; the first 16 words of which include the LAT (used to load the segment register sets) and which are also stored into a "golden copy," internal to processor 100, in order to simplify the process of swapping out that information.

In the embodiment shown, there are eight LAT entries 960.0 through 960.7 (any individual one of these will be called "LAT entry 960"), wherein each LAT entry 960 includes a first word (containing a limit value, a base value, and four mode bits) shown in FIG. 13A and a second word (960.0' through 960.7', containing a physical bias value and four mode bits) shown in FIG. 13B. A total of five mode bits are associated with each LAT entry. In addition there are various mode bits in word 960.1', including a scalar cache enable (SCE) bit 900 which, if one, enables the scalar cache 110. The mode bits are: readable segment (R), writable segment (W), executable segment (X), cacheable segment (C), and dirty segment (D). The R, W, and X bits are repeated in the first and second words of a LAT entry 960, in order that the LAT entry can be directed to the appropriate ports no matter which word of the first and second words arrives at processor 100 first. In one such embodiment, each address port pair (e.g., address port A 866.01 and address port A' 866.02) includes hardware to support up to three memory segments (e.g., memory segments 926, 927, and 928), which is loaded from up to three of the LAT entries 960.0 through 960.7. In this embodiment, any of the eight LAT entries 960.0 through 960.7 can be used to load each address port (e.g. address port E 866.N) or address port pair (e.g., address port A 866.01 and address port A' 866.02), as controlled by the mode bits of that LAT entry 860. Up to three of LAT entries 960.0 through 960.7 are loaded into each address port or address port pair. For example, a LAT entry 960 which has its R mode bit "set" will load into read address port A 866.01, read address port A' 866.02, read address port B 866.11, and read address port B' 866.12. Similarly, a LAT entry 960 which has its W mode bit "set" will load into write address port C 866.21 and write address port C' 866.22. Similarly, a LAT entry 960 which has its X mode bit "set" will load into instruction buffer fetch (executable code) address port D 866.31 and instruction buffer fetch address port D' 866.32. Finally, a LAT entry 960 which has its R or W mode bits "set" will load into scalar-cache address port E 866.N. The C mode bit further defines the operations allowed by address port E 866.N: if the C mode bit is one and the SCE bit 900 in the exchange package 980 is one, cache-line load operations are allowed; if either bit is off, cache line-load operations are not allowed. If LAT entry 960 has more than one of the mode bits R, W, X, or C set, each of the corresponding ports will be loaded from that LAT entry 960. If more than three of LAT entries 960.0 through 960.7 have a particular one of the mode bits R, W, X, or C set, then unpredictable results will occur (since in this embodiment, the order of arrival of the words from exchange package 980 is temporally indeterminate, and which three of the LAT entries 960.0 through 960.7 end up in the corresponding address port is thus indeterminate).

The D bit is set to "dirty" if a write operation is performed to the associated segment. This information is also copied into the "golden copy" of the first sixteen words of the exchange package 980.

In one embodiment, if an A register 130 or S register 120 write request occurs for which data are to be stored in a cache line 610 that is currently undergoing a cache-miss-sequence operation (i.e., for which a cache-line fetch is in process), the write request is entered into the activity register 810, where it waits until the fetch of the cache line fetched as a result of the miss sequence has completed, and then the cache word entry can be updated by the held-off write request. The operation of this "wait-and-write-into-cache-line" mechanism is shown in FIG. 5.

When updating or replacing pages 61 in scalar data cache 110, pages 61 are considered to be in an 8-position circular buffer. If all pages 61 have one or more valid cache lines 610, then the oldest page 61 in scalar data cache 110 is replaced in any cache-miss sequence. After an exchange sequence, each sequential page is filled until all 8 pages are valid. Any pages that are changed from valid to invalid (due to, e.g., vector write requests) do not affect the circular replacement order. The replacement pointer advances to replace all older pages, and thus eventually replaces the invalid page. In effect, the number of possible pages in the cache is temporarily reduced.

In the embodiment shown in FIG. 1, there is no communication between caches on different CPUs 100. If two or more caches have data in them from the same physical address 390, and one CPU 100 stores data into the shared data space, that CPU 100's cache is updated and common memory 602 is updated; however, the other CPU 100's cache is left with stale data. This problem may be handled in several different ways:

(A) there are specific load instructions which will check scalar cache 240 for a particular address and invalidate the corresponding cache line if the cache line is valid for that address; the specific load instruction references are then always satisfied from common memory. These instructions can be useful to synchronize two tasks working on a common memory area.

(B) LATs (Logical-Address Tables) can be used to establish data spaces that are not cached. ("cache enable" bit C is one of the mode bits in the LAT.)

(C) There is an instruction that invalidates the entire cache, so that new scalar load operation requests are satisfied from common memory 602, thus updating the cache.

(D) There is a SCE bit 900 in the exchange package that disables any use of the scalar cache 110 for the entirety of that particular job.

Almost any cache can be made to thrash. The term "thrash" refers to the situation where data fetched into a cache are replaced by other data before they can be used or re-used to advantage. For example, in an embodiment with 8 cache pages, if a program uses only one word from each cache page, a cache could hold 8 words that are actually being referenced, even though perhaps 128 words (the 8 cache lines (each cache line containing the 1 referenced word and 15 words which are not being used) times 16 data words per cache line) have been requested from memory and fetched, and the cache could hold up to 1024 data words (8 pages times 8 cache lines times 16 data words). As a ninth single word is fetched, the oldest one word of the above-mentioned 8 is replaced. If the program then again references that replaced word, it is again fetched into cache, replacing the next-oldest word. A program loop which accesses 9 or more scalar values, each on a separate page, can thus cause the cache to thrash and retrieve massive amounts of unused data. (In this example, 15 unused data words would be fetched for every used data word.)

In one embodiment, load operations ("loads") which result in a cache hit return data to the destination register in about 10 clock pulses, as compared to about 48 clock pulses if the same data must be fetched from common memories 602. If a cache-miss sequence is in-process for the requested line (i.e., the cache line has already been requested by a previous instruction, but has not yet been received in cache), the data can be returned at somewhere between the above-mentioned 10 and 48 clock pulses.

As can be seen from the discussion above, a multitude of high-speed data transfers can be arranged to occur simultaneously, a process which would not be as efficient without a scalar data-cache structure. The embodiment shown in FIG. 1 also allows maximum utilization of expensive subsystem components such as pipelines and vector processors by placing scalar data cache 110 outside of the pipeline between common memories 602 and the vector registers 160.

In order to ensure data integrity, the embodiment shown in FIG. 3 monitors write operations performed by those registers which do not use scalar data cache 110. If such a write operation is performed to a location which is currently cached in scalar data cache 110, cache controller 210 causes the appropriate cache line to be invalidated. Invalidation is accomplished by having validity set/reset controller 361 appropriately "tag" cache lines that have been superseded. This prevents "stale" data in the cache from appearing valid or being used.

Another aspect of using the present invention in a computer system which uses pipelines, e.g., in the paths between common memories 602 and the CPU 100, is that if a first access incurs a miss, it is desirable to execute subsequent instructions which do not conflict with the instruction which is now waiting for its cache line to be filled. Any suitable method may be used to determine whether there is such a conflict, and to execute subsequent non-conflicting instructions.

In the embodiment shown in FIG. 3, cache controller 210 accommodates access to data in other cache lines during the time after missed data have been requested and before said data return to the cache and are marked as valid.

In one embodiment, cache controller 210 accommodates more than one outstanding cache-line-fetch-to-fill-cache-miss operation at a time. There potentially could be lock-up problems if the number of outstanding cache-line fetches allowed exceeded the number of pages in scalar data cache 110. For example, if a system were to allow nine outstanding cache-line fetches for a cache with only 8 pages, a ninth miss could replace the page in a LAPIC register 310 for a cache line which had not yet returned from common memories 602. This problem is avoided in the present invention by limiting the number of outstanding cache-line fetches to less than the number of cache pages. In one such embodiment, up to four not-completed cache-line-fetch requests can be outstanding simultaneously; the execution of a fifth cache-line-fetch request is then held off until one of the earlier requests completes.

Another potential lock-up problem that is solved in the present invention occurs when there is an outstanding cache-line fetch in progress to the frame having the oldest page (as indicated by the oldest page counter 360). A cache-page miss which would otherwise load its logical-reference-page address 311 into the LAPIC registers 310 to replace that oldest page is held off until that cache-line fetch completes and the registers which are the destination of that data are loaded therefrom. In the embodiment shown in FIG. 3, cache controller 210 keeps track of which frames (and thus pages) have outstanding cache-line fetches, and causes a hold-off for any instruction which would replace a page that has an outstanding cache-line fetch in progress until the fetch and the associated load of the destination register are completed. In the embodiment shown in FIG. 3, a set of cache-line-fetch-in-progress (CLFIP) bits 380 is maintained. One cache-line-fetch-in-progress bit is provided for each cache line 610 in scalar data cache 110. In one embodiment, when the requested cache line arrives, the corresponding cache-line validity bit 340 is set "valid", but the corresponding CLFIP bit 380 is not reset. Thus, if both bits are reset, the corresponding cache line is invalid; if the CLFIP bit is set and the cache-line-validity bit is reset, the fetch is pending; and if both bits are set, the fetch has completed and the corresponding cache line is valid. In one such embodiment, if any of the eight CLFIP bits for a particular LAPIC register 310 is set, then that LAPIC register 310 is valid. Alternative embodiments are possible, such as when a cache line 610 is marked valid by the corresponding bit in cache-line validity bits 340 being set "valid", the corresponding bit in cache-line-fetch-in-progress bits 380 is also reset to indicate that the outstanding fetch has completed.

Referring to FIG. 3, if logical-reference-page address 311 is not found in the LAPIC registers 310, then the contents of the LAPIC register 310 having the oldest page (as indicated by the oldest page counter 360) are replaced with the logical-reference-page address 311 from the requested logical address 350; at substantially the same time, all cache-line validity bits 340 for that page are reset to "invalid". An operation to fetch all of the data words for that cache line is then invoked, as described above. In the embodiment shown in FIG. 3, this cache line includes sixteen data words, and the cache-line-fetch operation includes two 8-word fetch commands. When the final data word of these two 8-word fetches is completed, the validity bit associated with that cache line is set "valid" in the cache-line validity bits 340 by the validity set/reset controller 361.

The performance benefit provided by scalar data cache 110 varies according to the job being run by the computer (some jobs have, either by the nature of the program or by the design of the compiler, or both, more locality of reference than other jobs) and by the job environment (whether other jobs are multitasking in the same processor, thus causing more frequent job exchanges and the clearing of data from the cache that each job exchange entails). Certain programs may need to be redesigned to avoid actually losing performance due to poor locality of reference. Several approaches to such redesign are described above.

The above description provides what is herein called "an N-way associative scalar data cache with write-through capabilities" for a scalar/vector processor. In the embodiment shown in FIG. 3, "N-way" is eight-way, and a fully associative (meaning any page 61 can be mapped into any frame 241) scalar data cache 110 is provided, and an eight-way broadside compare is performed substantially simultaneously to determine whether a particular logical address 350 is currently in the cache. Other caching strategies could be implemented and still fall within the scope of the present invention.

It is to be understood that the above description is intended to be illustrative, and not restrictive. Many other embodiments will be apparent to those of skill in the art upon reviewing the above description. For instance, in the embodiment shown in FIG. 3 described above, logical addresses 350 of data in common memories 602 are used to access and maintain scalar data cache 110, but a person skilled in the art could use other analogous methods to the same effect; for instance, physical addresses 390 could be used. The scope of the invention should, therefore, be determined with reference to the appended claims, along with the full scope of equivalents to which such claims are entitled.

What is claimed is:

1. A computer system comprising:
   a common memory; and
   a computer coupled to the common memory, the computer operating on instructions including an instruction which provides a plurality of logical addresses each corresponding to a different data word, the computer comprising:
      a plurality of address ports, each one of the address ports configured to receive a different one of the plurality of logical addresses and comprising a logical-address translator, each one of the logical-address translators comprising:
         a plurality of segment register sets, wherein each one of the plurality of segment-register sets holds values which specify address boundaries and translation mapping of a corresponding logical segment;
         a segment detector coupled to the plurality of segment-register sets, wherein the segment detector operates to determine whether the received logical address is within the specified address boundaries of each respective corresponding logical segment;
         an address mapper coupled to the plurality of segment-register sets, wherein the address mapper operates to translate the logical address into a physical address; and
         a translation controller connected to the segment detector and the address mapper, wherein the translation controller operates to output the physical address if the segment detector determines that the logical address is within the specified address boundaries of one of the corresponding logical segments.

2. The computer system according to claim 1 wherein each one of the plurality of segment-register sets holds values which specify a base address and a limit address.

3. The computer system according to claim 1, wherein each one of the plurality of segment-register sets holds a physical address bias value, and wherein the address mapper operates to translate the logical address into a physical address by adding the physical address bias value to the logical address.

4. The computer system according to claim 1, wherein two of the plurality of address ports are grouped as an address port pair, wherein the address port pair operates to output, substantially simultaneously, an address of an even element of a vector and an address of an odd element of the vector.

5. The computer system according to claim 1, wherein each of the plurality of address ports further comprises:
   a port length register; and
   a port length decrementor coupled to decrement a value of the port length register; wherein the port length register indicates a number of elements remaining to be fetched from the common memory.

6. The computer system according to claim 1, wherein the plurality of address ports includes:
   an address port that handles addresses for vector fetches but not instruction fetches; and
   an address port that handles addresses for instruction fetches but not vector fetches.

7. The computer system according to claim 2, wherein each one of the plurality of segment-register sets holds a physical address bias value, and wherein the address mapper operates to translate the logical address into a physical address by adding the physical address bias value to the logical address.

8. The computer system according to claim 6, wherein the plurality of address ports further includes:
   an address port that handles addresses for scalar fetches but not vector or instruction fetches.

9. A method of providing a translated physical address from a logical address in a computer, the computer coupled to a common memory and having a plurality of address ports, the method comprising the steps of:
   providing an address translator for one of the plurality of address ports;
   specifying address boundaries for each of a plurality of logical segments associated with the address translator, wherein the plurality of logical segments includes a first logical segment;
   specifying a translation mapping for each of the plurality of logical segments;
   for each one of the plurality of logical segments, determining whether the logical address is within the address boundaries of said each one logical segment;
   translating the logical address into a physical address for the first logical segment; and
   if the determining step determines that the logical address is within the first logical segment, then outputting the physical address.

10. The method according to claim 9, wherein the address boundaries specify a base address and a limit address.

11. The method according to claim 9, wherein the step of translating the logical address into a physical address includes adding a physical address bias value to the logical address.

12. The method according to claim 9, further comprising the steps of:
   grouping two of the plurality of address ports as an address port pair; and
   operating the address port pair to output, substantially simultaneously, an address of an even element of a vector and an address of an odd element of the vector.

13. The method according to claim 10, wherein the step of translating the logical address into a physical address includes adding a physical address bias value to the logical address.

14. A computer system comprising:
   a common memory; and
   a computer coupled to the common memory, the computer operating on instructions which provide a logical address to a data word, the computer comprising:
      a plurality of address ports, each one of the address ports comprising a logical-address translator, each one of the logical-address translators comprising:
         means for specifying boundaries for each of a plurality of logical segments associated with the address translator, wherein the plurality of logical segments includes a first logical segment;
         means for specifying a translation mapping for each of the plurality of logical segments;
         for each one of the plurality of logical segments, means for determining whether the logical address is within the address boundaries of said each one logical segment;
         means for translating the logical address into a physical address for the first logical segments; and
         means for outputting the physical address on the condition that the determining means determines that the logical address is within the first logical segment.

15. The computer system according to claim 14, wherein each means for specifying address boundaries specify a base address and a limit address.

16. The computer system according to claim 14, wherein each means for specifying a corresponding translation mapping specifies a physical address bias value, and wherein the means for translating the logical address into a physical address operates to translate the logical address into a physical address by adding the physical address bias value to the logical address.

17. The computer system according to claim 14, wherein two of the plurality of address ports are grouped as an address port pair, wherein the address port pair operates to output, substantially simultaneously, an address of an even element of a vector and an address of an odd element of the vector.

18. The computer system according to claim 14, wherein each of the plurality of address ports further comprises:
   a port length register; and
   a port length decrementor coupled to decrement a value of the port length register; wherein the port length register indicates a number of elements remaining to be fetched from the common memory.

19. The computer system according to claim 14, wherein the plurality of address ports includes:
   an address port that handles addresses for vector fetches but not instruction fetches; and
   an address port that handles addresses for instruction fetches but not vector fetches.

20. The computer system according to claim 15, wherein each means for specifying a corresponding translation mapping specifies a physical address bias value, and wherein the means for translating the logical address into a physical address operates to translate the logical address into a physical address by adding the physical address bias value to the logical address.

21. The computer system according to claim 19, wherein the plurality of address ports includes:
   an address port that handles addresses for scalar fetches but not vector or instruction fetches.

22. A computer system comprising:
   a common memory; and
   a computer coupled to the common memory, the computer operating on instructions which provide a logical address to a data word, the computer comprising:
      a logical-address translator comprising:
         a plurality of segment register sets, wherein each one of the plurality of segment-register sets holds values which specify address boundaries and translation mapping of a corresponding logical segment;
         a segment detector coupled to the plurality of segment-register sets, wherein the segment detector operates to determine whether the logical address is within the specified address boundaries of each respective corresponding logical segment;
         an address mapper coupled to the plurality of segment-register sets, wherein the address mapper operates to translate the logical address into a physical address; and
         a translation controller connected to the segment detector and the address mapper, wherein the translation controller operates to output the physical address if the segment detector determines that the logical address is within the specified address boundaries of one of the corresponding logical segments.

23. The computer system according to claim 22, wherein each one of the plurality of segment-register sets holds values which specify a base address and a limit address.

24. The computer system according to claim 22, wherein each one of the plurality of segment-register sets holds a physical address bias value, and wherein the address mapper operates to translate the logical address into a physical address by adding the physical address bias value to the logical address.

25. The computer system according to claim 22, wherein the logical-address translator further comprises:
   a port length register; and
   a port length decrementor coupled to decrement a value of the port length register; wherein the port length register indicates a number of elements remaining to be fetched from the common memory.

26. The computer system according to claim 23, wherein each one of the plurality of segment-register sets holds a physical address bias value, and wherein the address mapper operates to translate the logical address into a physical address by adding the physical address bias value to the logical address.

27. A method of providing a translated physical address from a logical address in a computer, the computer coupled to a common memory, the method comprising the steps of:
   specifying address boundaries for each of a plurality of logical segments;
   specifying a corresponding translation mapping for each of the plurality of logical segments;
   determining whether the logical address is within the specified address limits of each of the plurality of logical segments;

translating the logical address into a physical address for one of the plurality of logical segments; and outputting the physical address if the determining step determines that the logical address is within the specified address limits of the corresponding logical segment.

28. The method according to claim 27, wherein the address boundaries specify a base address and a limit address.

29. The method according to claim 27, wherein the step of translating the logical address into a physical address includes adding a physical address bias value to the logical address.

30. The method according to claim 28, wherein the step of translating the logical address into a physical address includes adding a physical address bias value to the logical address.

31. A computer system comprising:

a common memory; and a computer coupled to the common memory, the computer operating on instructions which provide a logical address to a data word, the computer comprising:

a logical-address translator comprising:

means for specifying address boundaries for each of a plurality of logical segments;

means for specifying a corresponding translation mapping for each of the plurality of logical segments;

means for determining whether the logical address is within the specified address limits of each of the plurality of logical segments;

means for translating the logical address into a physical address for one of the plurality of logical segments; and means for outputting the physical address if the determining step determines that the logical address is within the specified address limits of the corresponding logical segment.

32. The computer system according to claim 31, wherein the address boundaries specify a base address and a limit address.

33. The computer system according to claim 31, wherein the means for translating the logical address into a physical address includes means for adding a physical address bias value to the logical address.

34. The computer system according to claim 31, wherein the logical-address translator further comprises:

a port length register; and a port length decrementor coupled to decrement a value of the port length register; wherein the port length register indicates a number of elements remaining to be fetched from the common memory.

35. The computer system according to claim 32, wherein the means for translating the logical address into a physical address includes means for adding a physical address bias value to the logical address.

* * * * *